(12) United States Patent
Zheng et al.

(10) Patent No.: US 12,099,558 B2
(45) Date of Patent: Sep. 24, 2024

(54) METHOD AND APPARATUS FOR PROVIDING CONTENT BASED ON USER ACTIVITY

(71) Applicant: Samsung Electronics Co., Ltd., Gyeonggi-do (KR)

(72) Inventors: Yinhe Zheng, Beijing (CN); Song Liu, Beijing (CN); Qing Wang, Beijing (CN); Yimeng Zhuang, Beijing (CN); Tiancong Pang, Beijing (CN)

(73) Assignee: Samsung Electronics Co., Ltd. (KR)

( * ) Notice: Subject to any disclaimer, the term of this patent is extended or adjusted under 35 U.S.C. 154(b) by 62 days.

(21) Appl. No.: 17/418,013

(22) PCT Filed: Dec. 24, 2019

(86) PCT No.: PCT/KR2019/018417
§ 371 (c)(1),
(2) Date: Jun. 24, 2021

(87) PCT Pub. No.: WO2020/138928
PCT Pub. Date: Jul. 2, 2020

(65) Prior Publication Data
US 2022/0067115 A1   Mar. 3, 2022

(30) Foreign Application Priority Data
Dec. 24, 2018   (CN) .......................... 201811584382.1

(51) Int. Cl.
*G06F 16/00* (2019.01)
*G06F 16/9535* (2019.01)
(Continued)

(52) U.S. Cl.
CPC .......... *G06F 16/9535* (2019.01); *G06N 5/02* (2013.01); *G06N 5/04* (2013.01)

(58) Field of Classification Search
CPC ..... G06F 16/9535; G06F 16/958; G06N 5/02; G06N 5/04; G06N 3/044; G06N 3/045; G06N 3/08; G06N 5/022; G06Q 30/02
See application file for complete search history.

(56) References Cited

U.S. PATENT DOCUMENTS 9,178,933 B1   11/2015   Soland
9,325,761 B1 *  4/2016   Weston, Jr. ............ H04L 67/60
(Continued)

FOREIGN PATENT DOCUMENTS

CN   101465878   6/2009
CN   102387207   3/2012
(Continued)

OTHER PUBLICATIONS

International Search Report dated Apr. 29, 2020 issued in counterpart application No. PCT/KR2019/018417, 3 pages.
(Continued)

*Primary Examiner* — Debbie M Le
(74) *Attorney, Agent, or Firm* — The Farrell Law Firm, P.C.

(57) ABSTRACT

Disclosed is an electronic device for providing more accurate contents to a user based on obtained personalization information. The electronic device includes at least one processor configured to collect information of a user based on user activities on the electronic device, analyze the collected information of the user for generating a personal knowledge graph of the user, provide the personalization information generated based on the personal knowledge graph to a content provider (CP), receive at least one content which is provided from the CP, and provide recommendation content selected from among the a least one content based on the personalized information.

16 Claims, 7 Drawing Sheets

(51) Int. Cl.
*G06N 5/02* (2023.01)
*G06N 5/04* (2023.01)

(56) References Cited

U.S. PATENT DOCUMENTS

| | | | |
|---|---|---|---|
| 9,600,769 B1* | 3/2017 | Liu | H04L 51/02 |
| 9,734,507 B2 | 8/2017 | Amidon et al. | |
| 9,948,998 B1* | 4/2018 | Cowan | H04N 21/4532 |
| 10,929,372 B2* | 2/2021 | Kelly | G06F 16/367 |
| 2010/0251305 A1 | 9/2010 | Kimble et al. | |
| 2014/0280575 A1* | 9/2014 | Cowan | H04L 67/54 |
| | | | 709/204 |
| 2014/0372425 A1 | 12/2014 | Ayoub et al. | |
| 2015/0302088 A1 | 10/2015 | Wu | |
| 2018/0181996 A1 | 6/2018 | Matthews et al. | |
| 2018/0253173 A1* | 9/2018 | Reiley | G06F 3/048 |
| 2019/0340529 A1* | 11/2019 | Circlaeys | G06F 16/9024 |
| 2021/0374579 A1* | 12/2021 | Dotan-Cohen | G06F 3/038 |
| 2022/0034989 A1* | 2/2022 | Kitsunezuka | H04W 4/025 |

FOREIGN PATENT DOCUMENTS

| | | |
|---|---|---|
| CN | 104008109 | 8/2014 |
| CN | 104866557 | 8/2015 |
| CN | 105931642 | 9/2016 |
| CN | 107918649 | 4/2018 |
| CN | 108681919 | 10/2018 |
| CN | 108960975 | 12/2018 |
| KR | 10-1784106 | 10/2017 |
| WO | WO 2017/041370 | 3/2017 |

OTHER PUBLICATIONS

Written Opinion dated Apr. 29, 2020 issued in counterpart application No. PCT/KR2019/018417, 6 pages.
Chinese Office Action dated Jul. 19, 2023 issued in counterpart application No. 201811584382.1, 32 pages.
Chinese Office Action dated Feb. 7, 2024 issued in counterpart application No. 201811584382.1, 14 pages.
"Intelligent Information Search Technology Based on Knowledge Graph and Semantic Computing", National Social Sciences Database, Jul. 2018, 6 pages.
Chinese Office Action dated May 11, 2024 issued in counterpart application No. 201811584382.1, 7 pages.

* cited by examiner

[Fig. 1]
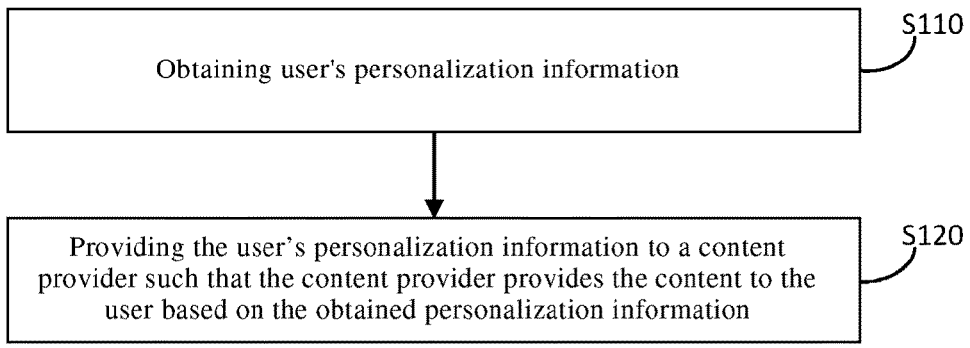
[Fig. 2]
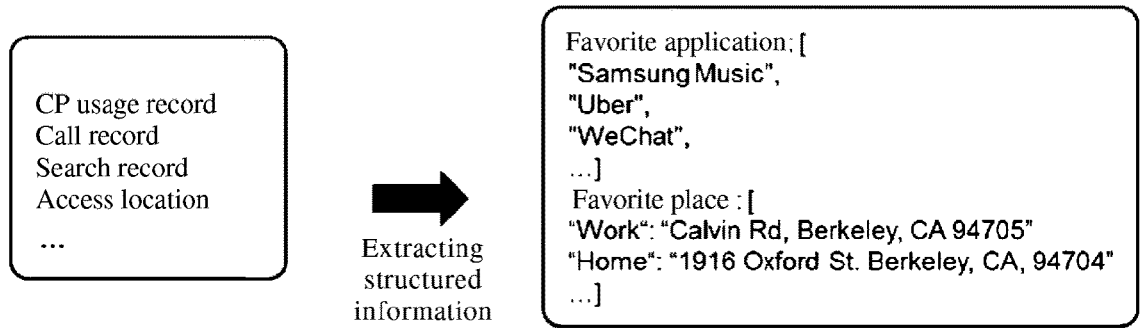
[Fig. 3]
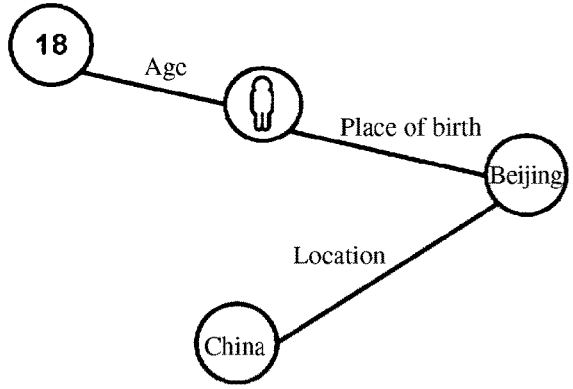
[Fig. 4]
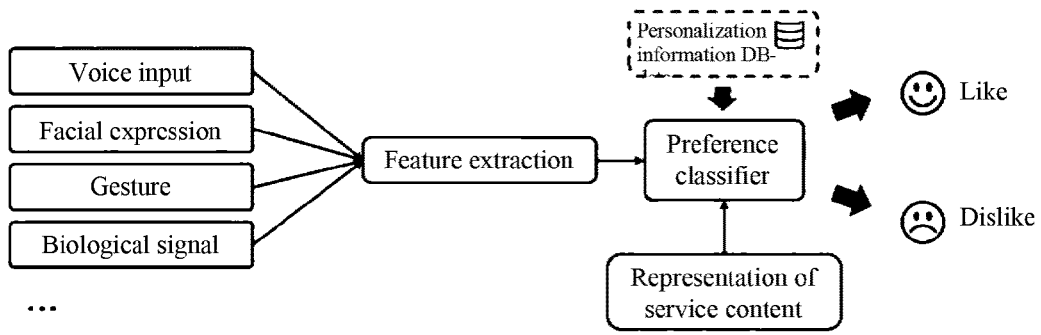

[Fig. 5]
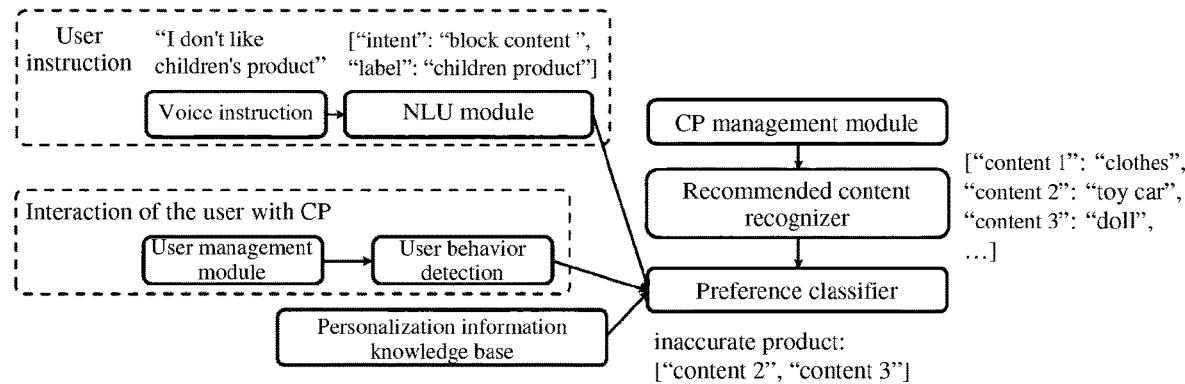
[Fig. 6]
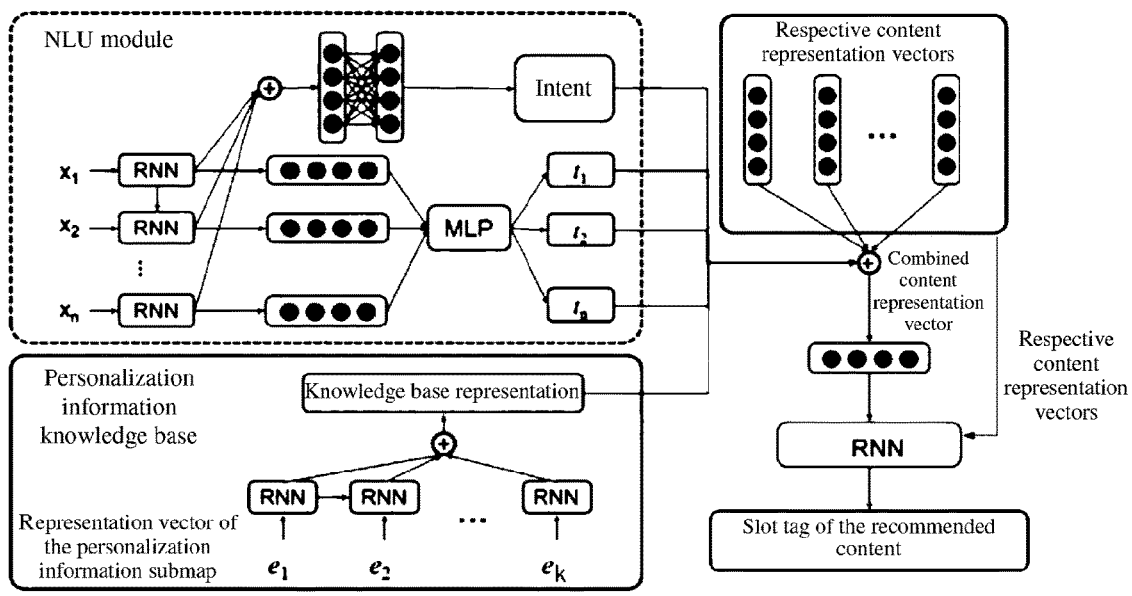
[Fig. 7]
[Fig. 8]
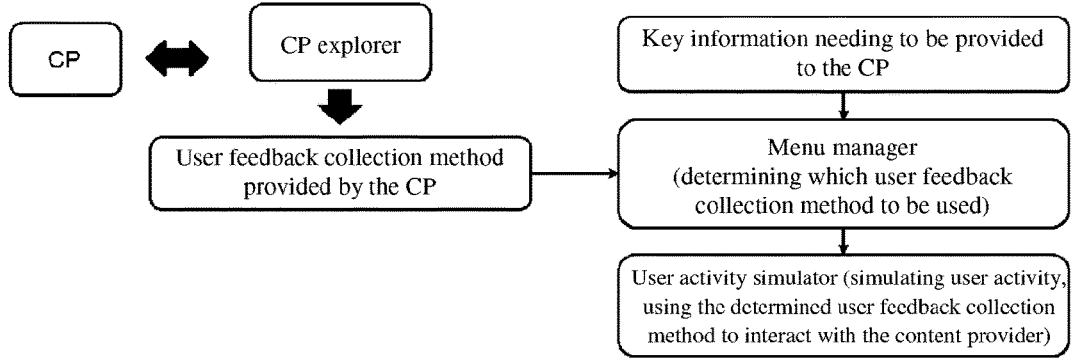

[Fig. 9]
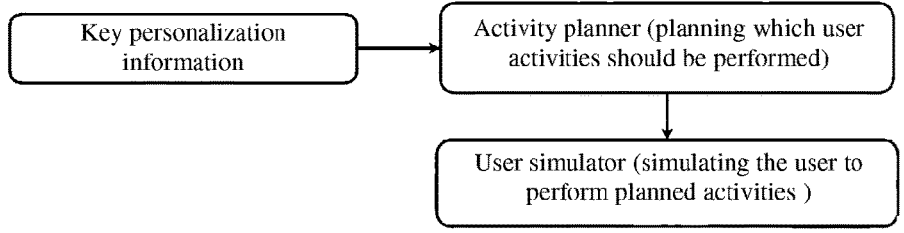
[Fig. 10]
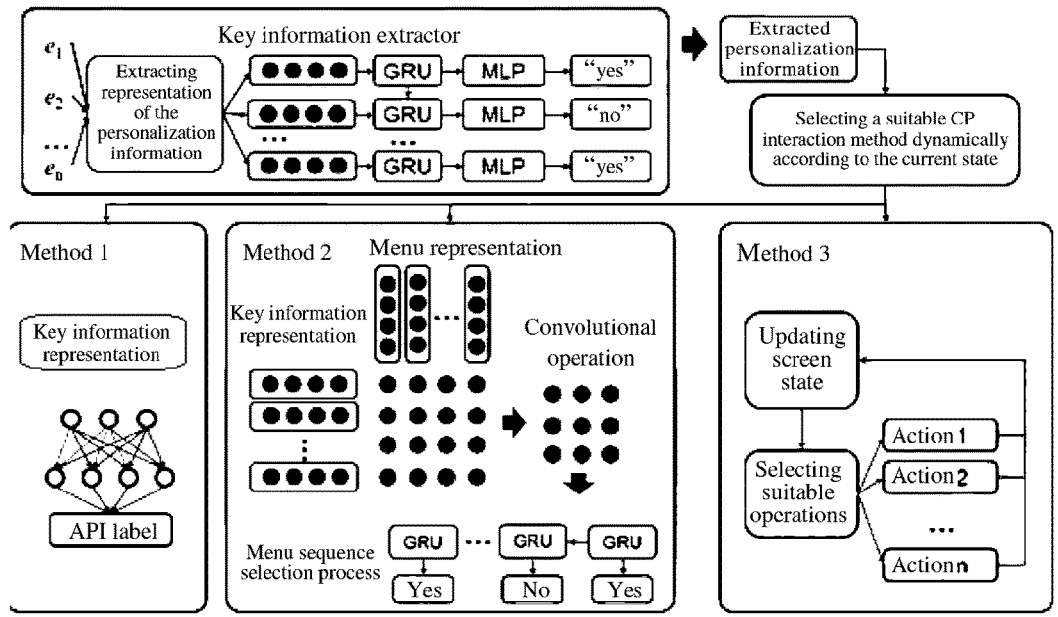
[Fig. 11]
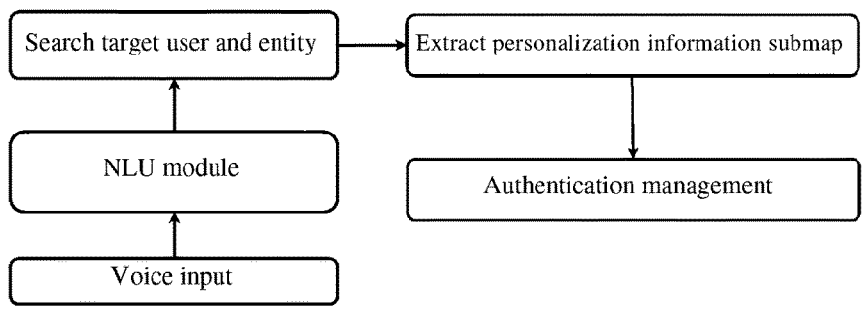
[Fig. 12]
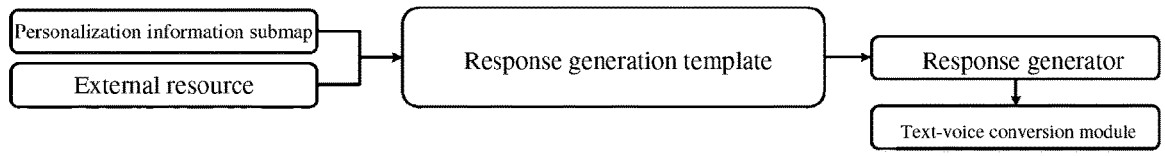

[Fig. 13]
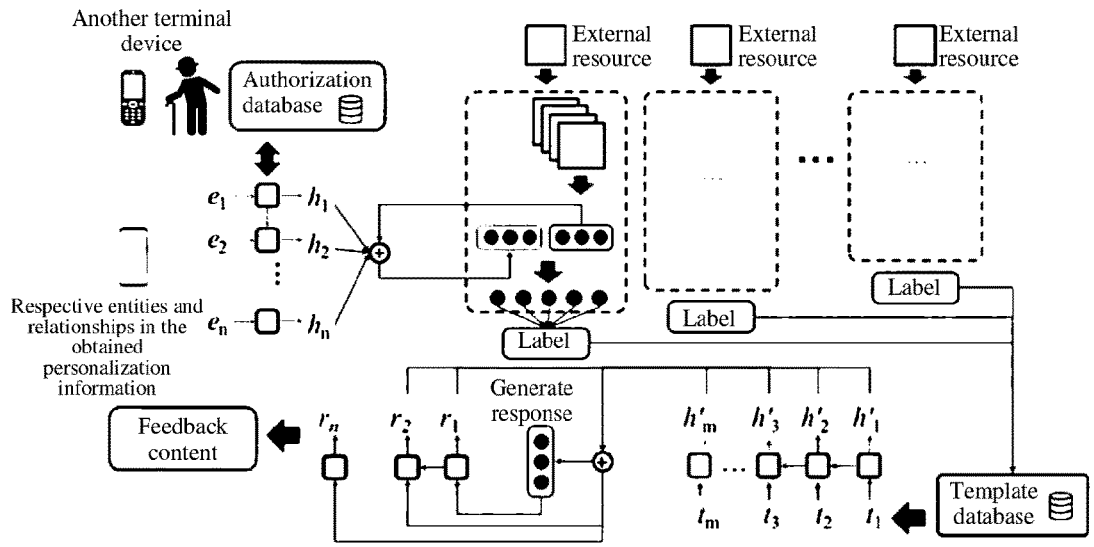
[Fig. 14]
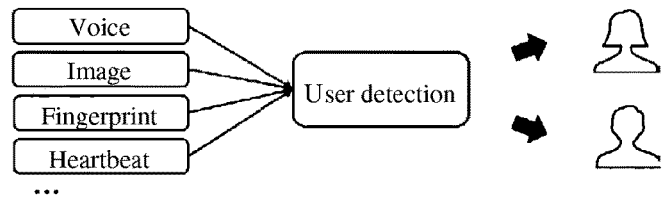
[Fig. 15]
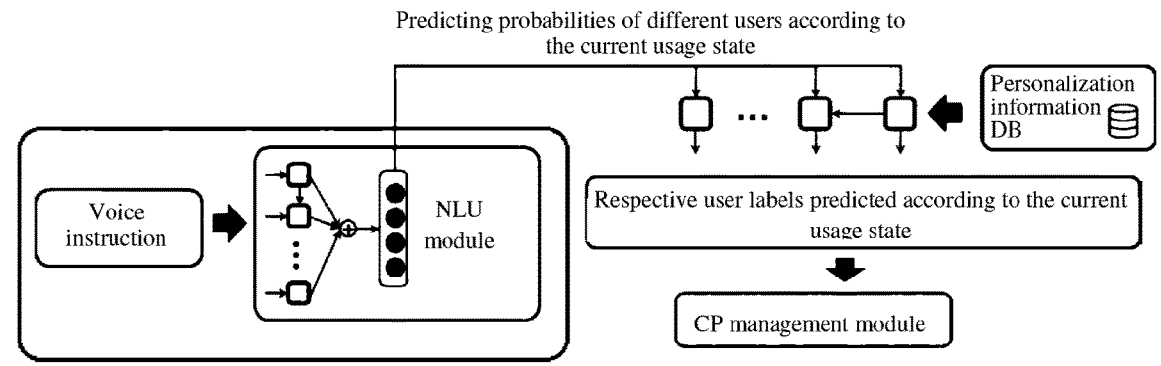
[Fig. 16]
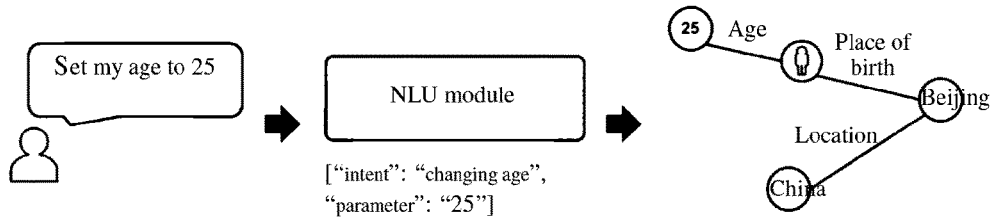

[Fig. 17]
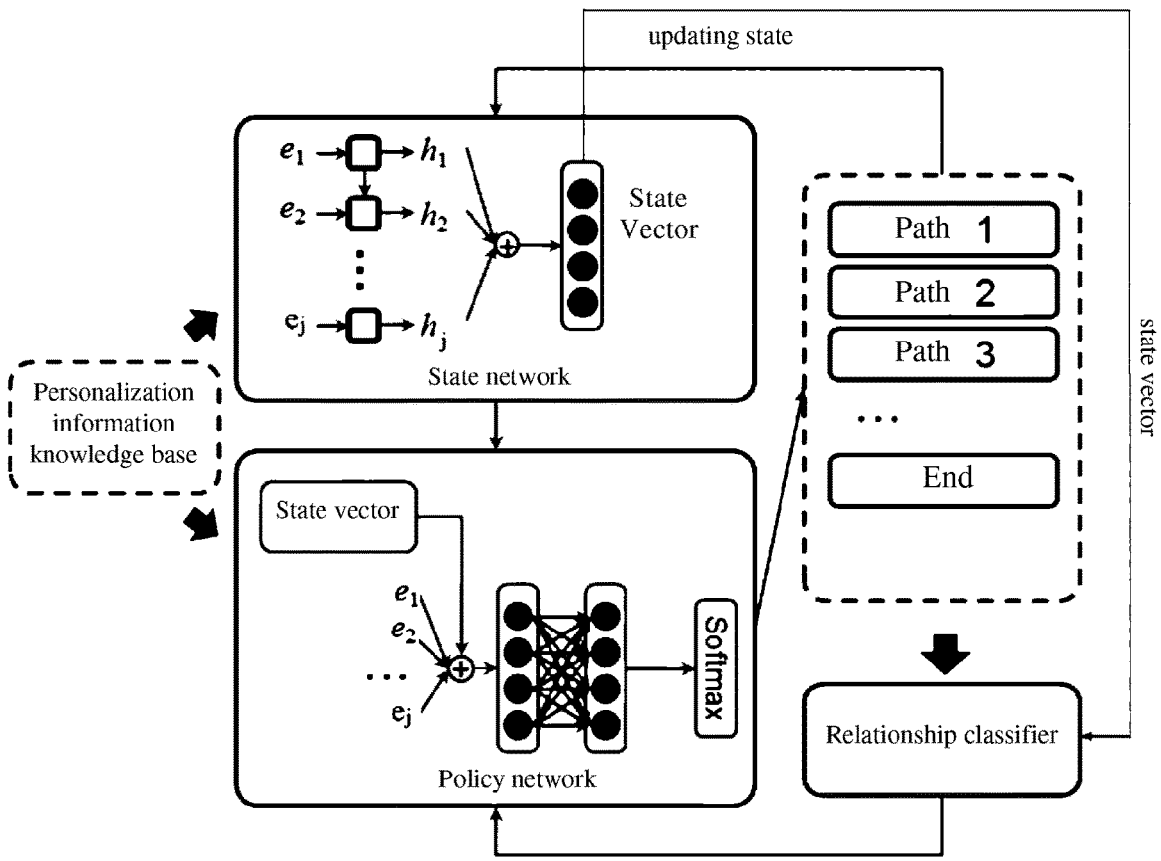
[Fig. 18]
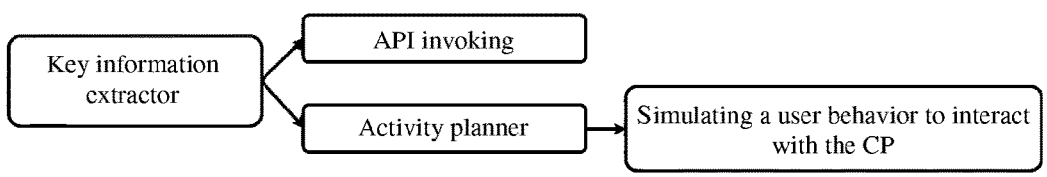
[Fig. 19]
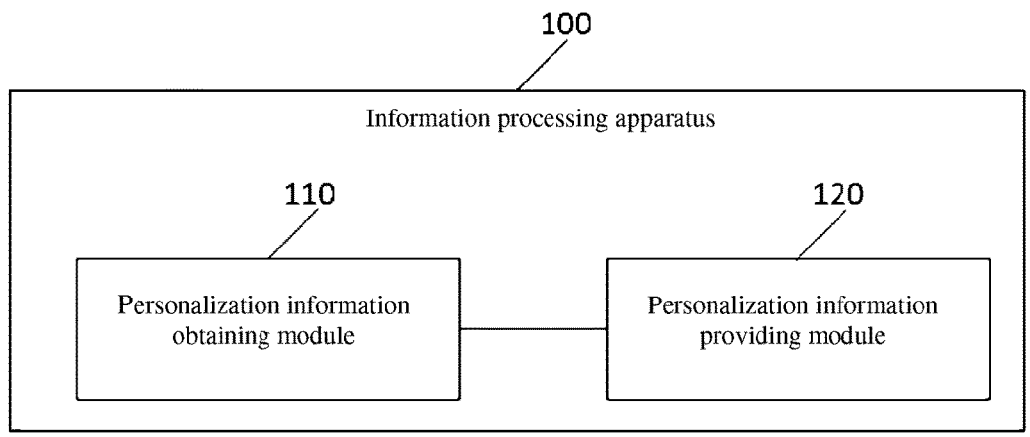

[Fig. 20]
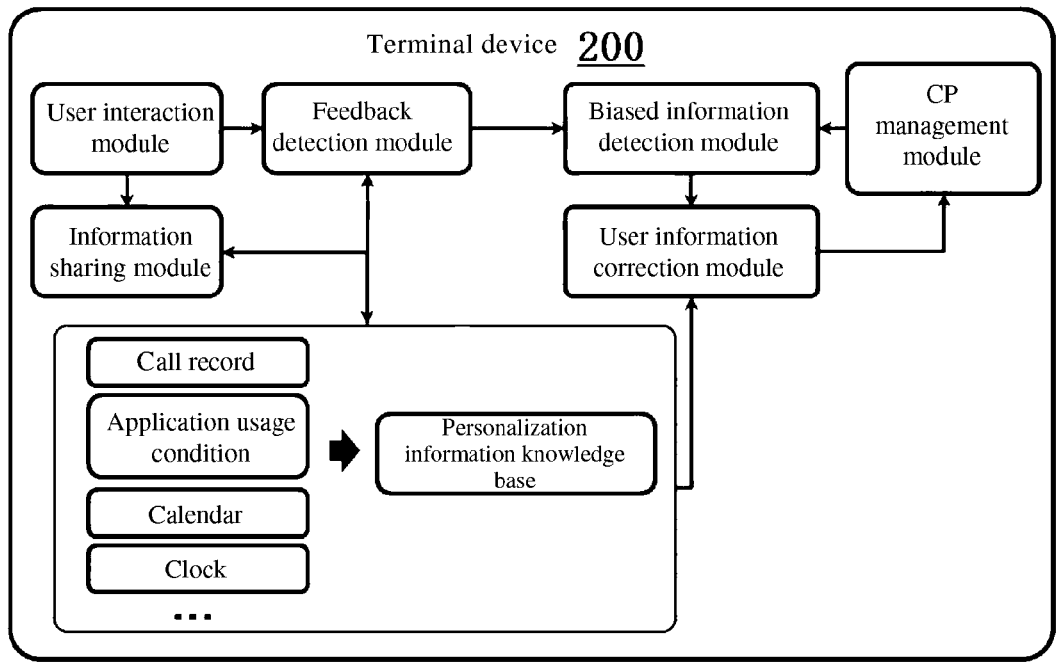
[Fig. 21]
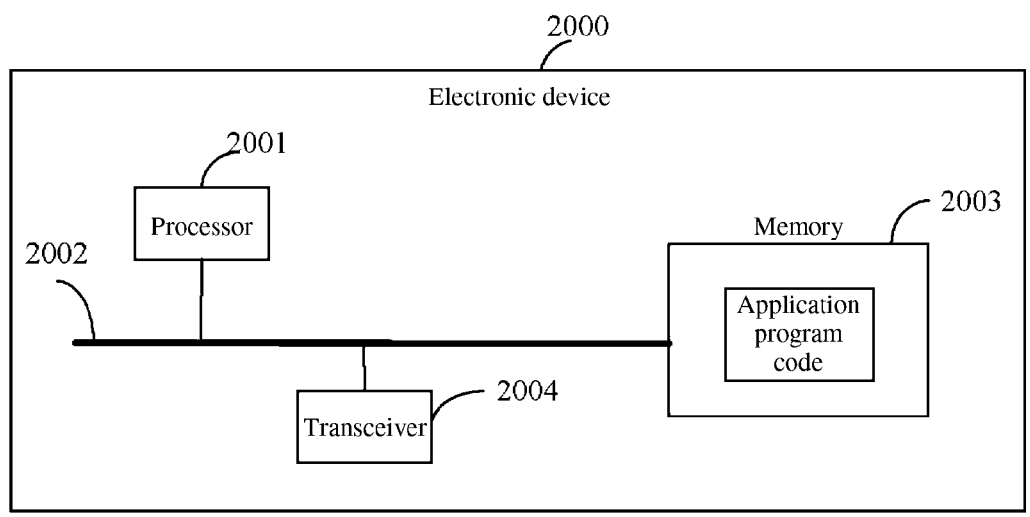

[Fig. 22]
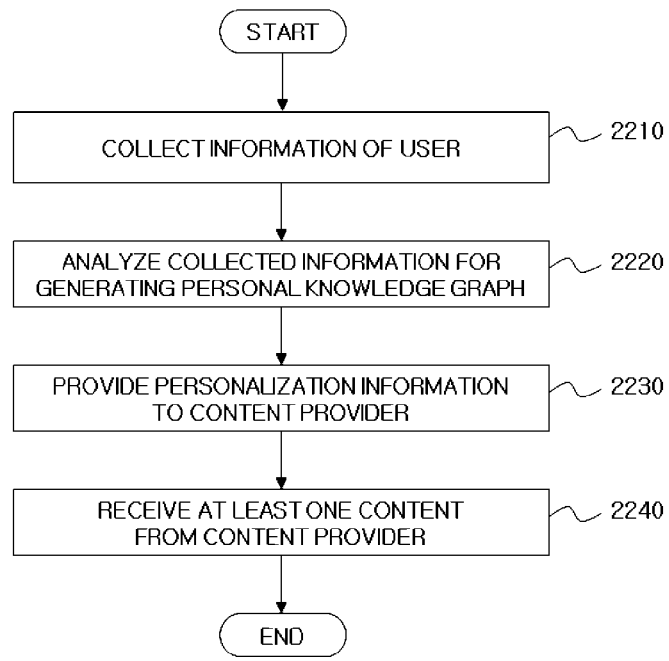

METHOD AND APPARATUS FOR PROVIDING CONTENT BASED ON USER ACTIVITY

PRIORITY

This application is a National Phase Entry of PCT International Application No. PCT/KR2019/018417 which was filed on Dec. 24, 2019, and claims priority to Chinese Patent Application No. 201811584382.1, which was filed on Dec. 24, 2018, the entire content of each of which is incorporated herein by reference.

TECHNICAL FIELD

The disclosure relates to the field of data processing technologies, and in particular, to an information processing method, apparatus, electronic device, and readable storage medium.

BACKGROUND ART

A content provider (CP) provides users with service contents, which may be various media contents such as text, image, audio and video. In order to provide a better service to users, CPs may provide a personalized service for each user according to the collected personalization information from each user.

However, the user's interest continues to change, and his or her personalization information also continues to change. It takes a long time for CPs to collect the personalization information. It may be difficult for CPs to have a comprehensive understanding of the user, to collect the user's personalization information in real-time, or to know a currently content of interest to the user accurately, so recommendations of CPs may be biased and not be related to what the user is really interested in, thereby reducing the user's experience.

DISCLOSURE OF INVENTION

Solution to Problem

Aspects of the disclosure are to address at least the above-mentioned problems and/or disadvantages and to provide at least the advantages described below. Accordingly, an aspect of the disclosure is to provide an apparatus and method for displaying a user interface.

Additional aspects will be set forth in part in the description which follows and, in part, will be apparent from the description, or may be learned by practice of the presented embodiments.

According to an embodiment, an electronic device is provided. The electronic device includes a memory storing instructions, and at least one processor configured to execute the instructions to collect information of a user based on user activities on the electronic device, analyze the collected information of the user for generating a personal knowledge graph of the user, provide personalization information to a content provider (CP) based on the personal knowledge graph, and receive at least one content which is provided from the CP.

According to an embodiment, a method is provided. The method includes collecting information of a user based on user activities on the electronic device; analyzing the collected information of the user for generating a personal knowledge graph of the user; providing personalization information to a content provider (CP) based on the personal knowledge graph; and receiving at least one content which is provided from the CP.

According to an embodiment, a computer program product is provided. The computer program product includes a computer readable medium having stored thereon instructions, which when executed, cause at least one processor to carry out the above method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 shows a schematic flowchart of an information processing method provided by an embodiment of the disclosure;

FIG. 2 shows a schematic diagram of a personalization information extraction method in an example of the disclosure;

FIG. 3 shown a schematic diagram of a personalization information representation method in an example of the disclosure;

FIG. 4 shows a schematic diagram of an implementation principle of a method for determining content of disinterest to the user in an example of the disclosure;

FIG. 5 shows a schematic flowchart of a method for determining whether the content provided by a CP belongs to the content of interest to a user in an example of the disclosure;

FIG. 6 shows a schematic flowchart of a method for determining whether each content provided by the CP belongs to the content of interest to the user in another example of the disclosure;

FIG. 7 shows a schematic diagram of an implementation principle of a method for providing personalization information to a CP in an example of the disclosure;

FIG. 8 shows a schematic diagram of an implementation principle of a method for providing personalization information to a CP in another example of the disclosure;

FIG. 9 shows a schematic diagram of a method for providing personalization information to a CP in a further example of the disclosure;

FIG. 10 shows a schematic flowchart of a method for providing personalization information to a CP in an example of the disclosure.

FIG. 11 shows a schematic diagram of an implementation principle of a method for obtaining user's personalization information corresponding to another terminal device according to an example of the disclosure;

FIG. 12 shows a schematic diagram of a method for determining content of interest to a user corresponding to another terminal device in an example of the disclosure;

FIG. 13 shows a schematic diagram of a method for determining content of interest to a user corresponding to another terminal device in another example of the disclosure;

FIG. 14 is a schematic diagram of an implementation principle showing acquiring user identification information in an example of the disclosure;

FIG. 15 is a schematic flowchart showing acquiring user identification information in an example of the disclosure;

FIG. 16 shows a schematic flowchart of a method for changing user's personalization information based on a user instruction in an example of the disclosure;

FIG. 17 shows a schematic flowchart of a method for determining whether to update user's personalization information in an example of the disclosure;

FIG. 18 shows a schematic diagram of an implementation principle of providing user's personalization information to a CP in an example of the disclosure;

FIG. 19 is a schematic structural diagram of an information processing apparatus provided by an embodiment of the disclosure;

FIG. 20 is a schematic structural diagram of a terminal device applicable to an embodiment of the disclosure;

FIG. 21 is a schematic structural diagram of an electronic device according to an embodiment of the disclosure; and FIG. 22 is a flowchart of a method according to an embodiment of the disclosure.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Addi-tionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application", "program", and "application program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and ex-ccutable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "module", "engine", or "device" may refer to a unit which processes at least one function or operation and may be implemented by hardware, software, or a combination of hardware and software.

Figures discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Products provided by a content provider (CP) may be contents, including various media contents such as text, image, audio and video. For example, many of the contents seen by users' terminal devices (e.g., cellphones and personal computers) may fall in a service range of content providers (CPs), including search engines, virtual community, news websites, entertainment websites, shopping websites, various apps (application), etc. The user may access various services provided by the CP on the terminal devices on a website or an application of the CP.

In order to improve a user's usage experience, the CP acquires the user's personalization information according to the user's history of activities on a website or an application corresponding to the CP, and provides personalized services to the user based on the user's personalization information. These personalized services include prioritizing to display products of interest to the user, prioritizing to present contents suitable for the user's preferences, recommending contents to the user based on the user's personalized information, and the like. For example, an e-commerce website usually collects the user's personalization information based on the user's past shopping records, search records, etc., and recommends the products of interest to the user. When the user opens a home page of the website, these products may be displayed on the home page. For another example, the e-commerce website or a search engine optimizes the user's search results according to the collected user's personalization information. After the user transmits a search request to the search engine, a large amount of matched contents are retrieved based on the search request, and then the e-commerce website or the search engine sorts the retrieved contents according to the user's interests, preferences, hobbies, etc., and rank the contents that the user is likely to be interested in.

However, the user's interest continues to change, and his or her personalization information also continues to change. It takes a long time for CPs to collect the personalization information. It may be difficult for CPs to have a comprehensive understanding of the user, to collect the user's personalization information in real-time, or to know a currently content of interest to the user accurately, so recommendations of CPs may be biased and not what the user is really interested in, thereby reducing the user's experience.

For example, a certain product that the user previously focused on an e-commerce website, but has subsequently purchased from another channel, and the e-commerce website may considers that the user is still interested in the product, and continue providing the user with relevant product information. For example, the user searches for an product on an e-commerce website A, and then the user purchases the product on an e-commerce website B, but a CP server of the e-commerce website A may not be aware that the user has already purchased the product. Accordingly, when the user subsequently logs in the e-commerce website A, the CP of the e-commerce website A may considers that the user is still interested in the product, and push relevant contents of the product to a terminal device of the user, so that the contents pushed to the user may be appropriate or inaccurate, which reduces the user's experience.

For another example, a user with a child at home has purchased some baby milk powder on a certain e-commerce website before, the user may no longer need such infant-products (e.g., baby formula) for now, but need preschoolers-products such as toys, or stationery. However, the e-commerce website may considers that the user is still interested in the milk powder, and continue recommending the same or similar milk powder for the user, which reduces the user's experience.

For another example, when the user first uses an application provided by a CP, therefore, there has been no interaction record of the user with the CP. In this case, the CP may not have any information about the user, and the user may not know which personal information should be provided to the CP for personalized services. Therefore, the CP may be unable to provide suitable personalized services to the user. The CP may need to have enough communications with the user to collect enough the user's personalization information. However, when the CP collecting personalization information, the user's private information may be leaked to unwanted third parties. Therefore, when the user first uses the application provided by the CP, the user may fail to obtain the personalized recommended contents, which reduces the user's experience.

For another example, when the user may occasionally search for certain contents or purchase a product for another user such as a gift, then a CP may establish inaccurate personalization information according to the user's activity for another user, and consider contents that the user has searched for, or purchased products as being an interest of the user, and relevant contents may be pushed to the user when the user uses the application later. For example, a user may occasionally help a friend to purchase some products on an e-commerce website, and the e-commerce website may inaccurately establish a user profile for the user according to such purchase records, and consider that the user is still interested in the such products. When the user subsequently logs in to the e-commerce website, the CP of the e-commerce website may still push the relevant contents of the product to the user's terminal device, so the user is recommended to the contents which he or she is not interested in, which reduces the user's experience.

For another example, it is possible that multiple users use the same account information of a CP. In other words, the same account may be shared among different users. For example, a child may use parents' mobile phone to search for contents, or a user A may occasionally use user B's account information to search for contents or purchase products, and the existing CP may be unable to accurately identify its users, such that the same contents may be recommended to different users even though they have different preferences.

For example, a user 2 searches for a product using account information of a user 1 on an e-commerce website A. A CP of the e-commerce website A may considers that the user 1 is interested in the product, and when the user 1 subsequently logs in the e-commerce website A, the CP of the e-commerce website A may push relevant contents of the product to the terminal device of the user 1, so that the contents pushed to the user is inappropriate or inaccurate, which reduces the user's experience.

According to embodiments of the disclosure, provided is an information processing method, an apparatus, an electronic device, and a readable storage medium. According to embodiments of the disclosure, CPs may provide more accurate service contents to users to enhance user experience.

FIG. 1 shows a schematic flowchart of an information processing method provided by the disclosure. At operation S110, user's personalization information is obtained. The user's personalization information may be user profile information of the user. According to an embodiment, the user's personalization information includes but is not limited to information regarding the user's interest, age, gender, occupation, geo-graphical location, social relationship, content of interest to the user, and the like.

At operation S120, the user's personalization information is provided to the content provider, such that the content provider provides the contents to the user based on the obtained personalization information.

According to an embodiment, the terminal device of the user may provide the user's personalization information to the content provider (that is, the CP) such that the CP is capable of obtaining the user's most accurate personalization information based on the user's personalization information provided by the terminal device. CPs may collect personalization information from users, and the personalization information is more comprehensive, complete and accurate to determine interests of the users than merely using the user's searching history. Therefore, according to an embodiment, the CP may provide more accurate contents to the user based on the obtained personalization information, which better meets the user's actual application needs, which enhance the user's experience.

According to an embodiment, providing a personalized content to a user from a CP may be implemented without interactions between the user and the CP. Therefore, even when the user uses a service provided by the CP for the first time, the terminal device may interact with the CP therebefore to provide the user's personalization information to the CP server to assist the CP to more accurately establish the user's personalized user profile, so that the CP may provide better services to the user based on the personalization information actively provided by the terminal device. According to an embodiment, the CP may become able to provide a personalized service to the user even when the user first uses the service provided by the CP.

For example, when a user uses a service provided by a travel management CP for the first time, the CP client of the CP may not have any interaction record of the user, and therefore, may not know any information about the user, such that the content provided by the CP to the user may not be personalized. According to an embodiment, when the user uses the service provided by the CP (e.g., when the user accesses the service) or before the user uses the service provided by the CP (e.g., when the user installs an application (APP) provided by the CP), the user's terminal device may initiate a series of interactions with the CP. During this process, the CP may obtain the user's personalization information. Therefore, when the user uses the service provided by the CP, the CP may provide better service for the user.

In an embodiment, the operation of obtaining the user's personalization information may include obtaining the user's personalization information according to the user's behavior of the user using the terminal device. The user's behavior may refer to user activities on the terminal device.

According to an embodiment, the user behavior of the user using the terminal device may include at least one of the following: interactions with content providers, communications with others, searching, the user's location, and user feedback on contents.

The user's personalization information may be obtained by the user behavior of the user using the terminal device. Based on the user behavior of the user using the terminal device, the user's personalization information may be obtained through user profiling technology or other method. The user's personalization information may be stored in a personalization information database. The personalization information database may be a database local in the terminal device, and/or a database in a cloud server, and/or a database in other electronic devices (which may be an external device of the terminal device, such as an external storage, etc.).

According to an embodiment, the user behavior of the user using the terminal device may include historical behavior. For example, the historical behavior may include a history of a certain user activity on the terminal device. The user behavior of the user may include a current behavior of the user, that is, while the user uses the terminal device, the user behavior may be collected in real time, so that the user's personalization information may be updated instantly.

In the embodiment of the disclosure, when collecting the user behavior of the user using the terminal device, the terminal device may collect information for different users. In other words, when collecting the user behavior, the terminal device may determine which user is currently using the terminal device first. Therefore, according to user behaviors of different users, the terminal device may store personalization information of different users in the personalization information database.

In an embodiment, the interactions with content providers may include, but is not limited to at least one of a clicking operation, a browsing operation, a searching operation, a bookmarking operation, a purchasing operation, a blocking operation, a deleting operation, a closing operation, a deleting bookmark operation, and a voice input operation and the like.

The communications with others may include, but is not limited to, at least one of a voice communication (e.g., a call), a text communication (e.g., texting), an image-based communication (e.g., sharing a picture, a video, etc.).

The searching may include, but is not limited to, at least one of an online searching (e.g., a query to a search engine) and an offline searching (a searching in the terminal device).

The user's location may include a location when a certain user activity is detected on the terminal device. The user's location may include a location where user turns on a locating function of the terminal device. The user's location may be related to a user behavior on a current location. The user's location may be related to a user behavior on a location of interest.

The user feedback on contents may include, but is not limited to, a setting operation on the terminal device (e.g., setting age, gender, etc.), a voice instruction to the terminal device for the setting operation (e.g., the user actively changes or sets the personalization information through the voice instruction).

It should be noted that the user behavior may include, but is not limited to, at least one of the user behaviors listed above. In an embodiment, the user's relevant information that may be obtained by the terminal device within the authorized range of the user may be regarded as interaction information between the user and the terminal device. In other words, all user behaviors that the terminal device may associate with the user within the range allowed by the user may be included in the user behavior of the user using the terminal device in the embodiment of the disclosure.

In an embodiment, the specific implementation form of the personalization information may be set according to the actual needs of CPs. In an embodiment, the personalization information may be structured information, and the terminal device may extract user's structured personalization information based on the user behavior of the user using the terminal device.

As an example, a schematic diagram of a method for extracting user's structured personalization information is shown in FIG. 2. As shown in the FIG. 2, the input of the extraction process is various types of interaction records recorded by the device, such as the CP usage record (i.e., the interactions with the CP), the call record (the communications with others), and the search record (the searching), access location (the user's location), etc., and the output may be the user's structured personalization information, such as the favorite application ["Samsung Music", "Uber" . . . ], etc. as illustrated in FIG. 2. The personalization information may be generated based on the user's personal knowledge graph. The personalization information may have the form of a knowledge graph.

In an embodiment, a piece of personalization information may be specifically represented by two entities and a relationship between the two entities in the personal knowledge graph. In other words, in the user's personalization information database, the user's personalization information maybe represented as a triple of this type (entity, relationship, entity) as a knowledge graph As an example, a representation of personalization information is shown in FIG. 3. As shown in FIG. 3, information such as "age", "place of birth", "location", etc. shown in FIG. 3 may be regarded as relationships between entities in a knowledge graph. The "user" (picture of a person shown in FIG. 3), "18", "Beijing", "China" and other information may be regarded as entities, respectively, and a relationship is mainly responsible for connecting two entities. In this example, three pieces of the user's personalization information (user, age, 18), (user, place of birth, Beijing), (Beijing, location, China) are shown.

In an embodiment, the user's personalization information is provided to the content provider, by detecting whether the user's personalization information is changed, and providing the user's personalization information to the content provider according to a detection result; and/or obtaining the content provided by the content provider to the user, and providing the user's personalization information to the content provider according to at least one of the user's personalization information and user feedback information, and the content is provided by the content provider to the user, wherein the user feedback information may include feedback information input by the user with respect to the at least one content provided by the content provider.

In an embodiment, the user's personalization information may be configured to be provided to the CP according to the actual needs. Specifically, when the user's personalization information is changed, the user's personalization information may be provided to the CP instantly, so that the CP may be aware of the latest personalization information. According to an embodiment, the terminal device may collect the personalization information according to the method for collecting the personalization information, and then periodically detect whether the user's personalization information is changed. The change of the personalization information may include at least one of the following items: adding the content of interest to the user, adding the content of disinterest to the user, reducing the content of interest to the user and reducing the content of disinterest to the user. When it is detected that the user's personalization information is changed, it may be considered that user's changed personalization information needs to be notified to the CP, and at this time, the operation of providing the user's personalization information to the content provider may be performed.

According to an embodiment, when the user is provided with the contents (i.e., services) provided by the CP, the user may input a feedback on a certain content or some contents or all the contents provided by the CP, and the feedback reflects whether the user likes the content(s) or not. Since the user's personalization information and the user feedback information is useful for reflecting preferences of the user, therefore the user's personalization information may be provided to the CP based on the user's personalization information and/or the user feedback information, as well as the content provided by the CP for the user.

According to an embodiment, for the content provided by the content provider to the user, the interface of the CP may be directly invoked to identify the content provided by the content provider to the user, or by using the technologies such as image (picture) recognition, voice recognition, and text recognition. Specifically, while the user using the CP, the content that the CP provides to the user usually includes image, text, sound, and the like. In order to enhance the user's experience, the CP usually per-sonalizes the correction of these services according to the user profiles that CP has created, such as presenting a product advertisement that the user is interested in, or playing an audio/video that the user likes. The monitoring of the services provided by the CP may be classified into three main types of tasks:

a). The first type of task is to monitor a picture displayed on the screen (the user interface of the CP client). This task is mainly responsible for analyzing contents of pictures seen by the user. The specific implementation process may be to intercept and present the pictures for the user by monitoring the display interface of the terminal, or, to identify the pictures by means of screen shot and the like, and parse the pictures into the structured data by image segmentation and graphic classification technologies to identify the contents to be provided to the user contained in the picture.

b). The second type of task is to monitor text displayed on the screen. This task is mainly responsible for understanding and analyzing text information seen by the user. Semantic understanding based on text information may be used in this task, and its main process may include: text preprocessing (e.g., word segmentation, text regu-larization, part-of-speech tagging, etc.) and natural language understanding (NLU).

According to an embodiment, for the processing of the text information, the NLU algorithm may be used to identify the text information, to identify content provided to the user contained in the text information. In another method, in order to improve the accuracy of the identification of the content, the text information and the picture may be combined to identify the contents provided to the user contained in the text, that is, to identify the current recommended content corresponding to each text information according to each text information and the picture associated with each text information. Specifically, the text and the picture may be combined to realize recognition of the currently recommended content corresponding to the text information. In an embodiment, for one piece of the text information, a picture associated with the text information may refer to a picture on the user interface of the CP client that is closest to the text information, or may be a picture that satisfies other predetermined conditions. The picture information associated with one piece of text information may be picture information of one picture or picture information of multiple pictures. The picture information associated with one piece of text information and the number of pictures may be different according to different methods for determining the associated picture.

In an embodiment, according to the text information and the picture information associated with respective text information, the respective information provided by the content provider to the user, may be identified by determining a text representation vector corresponding to each text information according to each text information; determining a picture representation vector corresponding to each text information according to the picture associated with each text information; combining the text representation vector and the picture representation vector corresponding to each text information to obtain a combined information representation vector corresponding to each text information; and, identifying the content contained in each text information (i.e., the content provided by the content provider to the user) according to the combined information representation vector corresponding to each text information.

According to an embodiment, obtaining a combined information representation vector may be implemented by a neural network. Since a piece of text information or a series of text information may include a plurality of intents of the user. In order to identify the content provided by the CP based on the text information, the content corresponding to the intent with highest probability of the plurality of intents carried in each text information may be regarded as the content corresponding to each text information. Specifically, for one piece of given text information and a picture corresponding to the text information, each text information and a picture associated with the text information is used as an input of a neural network, and the content corresponding to each text information may be determined as an output of the neural network.

As an example, the intent t carried in the text X is detected on the basis of the given input text (i.e., the text information) X, and the picture corresponding thereto (i.e., the associated picture) M. Assuming that all intents constitute an intent set T, the task of determining the content corresponding to the text information may be expressed by the following equation:

$$t = \mathop{\mathrm{argmax}}_{t^* \in T} P(t^* \mid X, M)$$

According to an embodiment, t* is any intent in the intent set T and argmax represents the value of t* which makes P(t*IX, M) have the maximum value. P(t*IX, M) represents the probability distribution of t* when a text X and a picture M is given. This probability distribution function may be represented by using a neural network, for example, a text-based convolutional neural network may be used as below equation to obtain a representation of the input text X:

$$R_x = CNN(X)$$

According to an embodiment, CNN represents a convolutional neural network operation, and $\underline{Rx}$ represents the extracted text representation vector.

Then a representation of the picture may be obtained by using a multi-layer convolutional neural network as below equation:

$$R_M = \text{Multi-}CNN(M)$$

According to an embodiment, Multi-CNN represents a multi-layer convolutional neural network, such as a residual network (ResNet), a visual geometry group network (VGG), etc. R y represents the extracted picture representation vector.

In the semantic understanding, $R_M$ and Rx may be combined, that is, to combine the text representation vector and the picture representation vector. The combination referred here may be splicing, summation, difference, or averaging, or even weighting average based on given weights. The representation vector obtained after the final combination may be denoted as R, and then R is the combined information representation vector corresponding to the text X. The distribution probability of the intent is finally obtained by inputting R into one fully connected network and connecting one input layer as below equation:

$$P(t^*IX,M) = \text{softmax}(FC(R))$$

According to an embodiment, FC represents a fully connected network, and softmax represents an output layer whose received input is the output of a fully connected network and the output is the distribution probability of the intent.

In other words, the input of the fully connected network is a combined information representation vector, and the output of the output layer is the distribution probability of each intent carried in the text information. At this time, the intent with the highest distribution probability may be used as the content corresponding to the text information based on the output of the neural network.

It should be understood that the specific type of the neural network in this example as one of various types. In an embodiment, other types of neural networks may also be selected as needed.

c). The third type of task is to monitor the voice information received by the user. This task is mainly responsible for understanding and analyzing the voice feedback input by the user. For the voice information, the voice information may be identified by the voice recognition model to identify a corresponding content. For example, the current application scenario may be classified by using any known algorithm, and the audio may be parsed into a structured representation.

In an embodiment, the representation of the content provided by the CP for the user may be configured according to actual needs. For example, the label and the corresponding attribute may be used to represent one current recommendation content. For example, the obtained label is: a mop, and its attributes are: red and wood, and the label and its attributes may be used to represent that CP recommends the content of "red and wooden mop" to a user. Each of contents provided by the CP for the user may be recorded in a provided content list.

In an embodiment, the user feedback information may include, but is not limited to, at least one of user's expression information, user's instruction information, user's biological signal information, and a user's interaction with the content provided by the content provider.

According to an embodiment, the user feedback information may include explicit feedback information or implicit information. Specifically, the user's expression information may be a liking or disliking expression presented by the user, for example, a user image may be obtained and current facial feature points of the user are detected in the user image to determine the current expression of the user. The user's instruction information may include an explicit instruction issued by the user to the terminal device, for example, the user may tell the terminal device that "I do not like such recommended content" as a voice instruction. The user's biological signal information may include, but is not limited to, at least one of information such as a user's heartbeat, body temperature, and user pupillary response. The interactions with the content provided by the CP may include that the user expresses that he or she likes the contents provided by one or some of the CPs, and/or that the user expresses that he or she does not like the contents provided by one or some of the CPs. For example, when the user collects or frequently views a certain content, it may indicate that the user is likely to like the content, that is, the user is interested in a type of the content. For example, when the user says "do not display next time" for a certain content on the CP client, it indicates that the content is not the content that the user is interested in.

The embodiments of the disclosure are not limited to how to obtain the user feedback information, and may be configured according to actual application scenarios and application requirements. For example, the user feedback information may be obtained by capturing the user's current facial expression using a camera, by tracking and analyzing the user's attention, by tracking the user's gesture trajectory or even collecting user's biological signal, or may be obtained, for example, actively asking whether the user is interested in the contents recommended by the CP to obtain the user feedback information. The user feedback information may also be obtained through instruction issued by the user parsed by voice recognition and NLU technologies.

In an embodiment, the operation of providing the user's personalization information to the content provider according to at least one of the user's personalization information and the user feedback information, and the content provided by the content provider to the user, may include: determining whether each content provided by the content provider to the user belongs to a content of interest to the user according to at least one of the user's personalization information and/or the user feedback information; and, providing the user's personalization information to the content provider based on whether each content provided by the content provider for the user belongs to the content of interest to the user.

In an embodiment, the CP creates a user profile of the user according to interactions of the user with the CP (e.g., search, purchase, browse, click, bookmarking, storing, tracking, etc.), and obtains user's personalization information. When the user uses an application corresponding to the CP, such as performing searching in the application, the CP may provide the content to the user according to the user's personalization information collected by the CP (including the content recommended to the user or the content determined based on a user search request). Therefore, before providing the user's personalization information to the CP, the terminal device may determine whether each content provided by the CP belongs to the content of interest to the user based on each content provided by the CP, and then, based on the determined result, the user's personalization information is provided to the content provider.

As can be seen from the foregoing description, the user's personalization information and the user feedback information may reflect the user's preference. Therefore, whether the content provided by the CP to the user belongs to the content of interest to the user is determined according to at least one piece of information of the user's personalization information and the user feedback information.

As an example, FIG. 4 shows a schematic diagram of an implementation of determining whether each content provided by the CP belongs to a content of interest to the user based on the user feedback information and the user's personalization information. As shown in the figure, when the user feedback information such as a user's facial expression, user gesture, user voice input, user's biological signal and the like as shown in FIG. 4 is obtained, the feature extraction component (e.g., a neural network model) may be used to perform feature extraction for extracting feature information in the user feedback information, then the extracted feature information, the user's personalization information and respective contents provided by the CP may be used as an input of the preference classifier, and it is determined that whether the content provided by the CP belongs to the interest of the user through the preference classifier, that is, the user likes or dislikes the content provided by the CP.

As an example, FIG. 5 shows a schematic diagram of a method for determining whether each content provided by the CP to the user (hereinafter referred to the content provided by the CP) belongs to a content of interest to the user. In this example, the user instruction shown in the dashed box in FIG. 5 and interaction of the user with the CP may be regarded as the user feedback information, and the user instruction (e.g., the information instruction given by the user) may be a voice instruction, an input text, a gesture of the user, but is not limited thereto. The interaction of the user with the CP may be a series of interactions with the CP after the user receives the content provided by the CP, such as clicking, viewing, sliding, on the content provided by the CP.

Referring to FIG. 5, an optional method for applying the user feedback information may be used when determining whether the content provided by the CP is a content of interest to the user. Specifically, the instruction issued by the user may be recognized as a text by an instruction recognition module, and then the recognized text is input into the NLU module (which may be a neural network model) to parse the text into a structured a combination of "intent-label", wherein the intent may be to block certain products, or to show more of a certain type of products, or to label names of products. As shown in FIG. 5, the received user instruction may be "I don't like children's product". After the voice recognition module recognizes text corresponding to the voice instruction, the recognized text is input into the NLU model. The output of NLU model may be structured information [intent: "block", "label": "children's product"] as shown in FIG. 5. Similarly, for the interaction of the user with the CP, the user management module and the user behavior monitoring module may be used to detect the interaction of the user with the CP, and determine the "intent-label" corresponding to the interaction, wherein the user management module and user behavior monitoring module may be implemented based on the neural network or another pre-configured user behavior recognition model.

The content provider management module shown in FIG. 5 may be a module for performing interaction between the CP and the terminal device, and the module may identify the content provided by the CP to the user, that is, displayed information of the client, and then respective contents corresponding to these pieces of display information may be recognized by the recommended content recognizer, content 1, content 2, and content 3 provided by the CP in FIG. 5 may be recognized as "clothes", "toy car" and "doll"

The preference classifier (which may be implemented by a neural network or a classification model) has a role to determine whether there is an improper content in the contents provided by the CP (i.e., whether the provided content is content of disinterest to the user) according to any one of the user feedback information and the user's personalization information (e.g., the current user's personalization information stored in a personalization information knowledge base (i.e., a database) which is a collection of personal knowledge graphs) and the content provided by the CP. As shown in FIG. 5, it may be determined that content 2 and content 3 are contents of disinterest to the user (that is, inaccurate content) is based on the user's personalization information and/or the feedback information through the preference classifier, this is, corresponding to the "toy car" and the "doll".

In an embodiment, the operation of providing the user's personalization information to the CP based on whether each content provided by the CP belongs to a content of interest to the user, may include: when at least one content in the respective contents provided by the CP is not a content of interest to the user, providing the user's personalization information to the CP.

In an embodiment, when there is no content of interest to the user among contents provided by the CP to the user, which may indicate that a user profile built for the user by the CP is not accurate enough to provide a personalized service to the user. At this time, the terminal device may allow the CP to update its user profile of the user, and the terminal device may provide the user's personalization information to the CP such that the CP updates its user profile based on the user's personalization information to provide better service to the user.

Specifically, since the user's personalization information or the user feedback information reflects the user's preferences, it may be determined, whether the content provided by the CP to the user belongs to a content of interest to the user, based on at least one of the user's personalization information and the user feedback information. When a currently recommended content is the content of interest to the user, it may indicate that to some extent that a user profile built by the CP or information collected by the CP is relatively accurate. In this case, the user's personalization information may not be provided to the CP temporarily. When there is a content of disinterest to the user among the recommended content, the terminal device may provide the user's personalization information to the CP.

In an embodiment, the operation of determining whether each content provided by the content provider to the user belongs to the content of interest to the user according to at least one of the user's personalization information and the user feedback information, may include: determining each content representation vector corresponding to the content provided by the content provider for the user; determining a weight of each content representation vector according to at least one of the user's personalization information and the user feedback information; obtaining a combined content representation vector based on each content representation vector and the weight of each content representation vector; and, determining whether each content provided by the content provider for the user belongs to the content of interest to the user according to the combined content representation vector.

For each content provided by the CP for the user, the content may be represented by the content representation vector corresponding to each content, and the vector indicates a content feature of each content. The user's personalization information or the user feedback information may reflect the user's preferences. Therefore, the weight of each content representation vector may be determined based on at least one of the user's personalization information and the user feedback information. The weight of each content representation vector may represent how close each content to the user preferences, that is, the degree of similarity. In an embodiment, a normalized weight may be used, that is, the sum of the weights of all content representation vectors is equal to one. The greater the weight of the content representation vector is, the greater the possibility that the content provided by the CP to the user corresponding to the content representation vector close to the content of interest to the user. Therefore, based on each content representation vector and the weight of each content representation vector, the obtained combined content representation vector may represent a degree of correlation between each content representation vector and the user preferences. In addition, the combination may also eliminate noise, and enhance the content feature. In other words, by the combination, some noisy data influence may be eliminated such that the combined content vector may accurately reflect the relationship between each content provided by the user and the user preference, thus whether the content belongs to the content of interest to the user is determined more accurately based on the combined vector.

When the CP provides a plurality of contents to the user, the terminal device may separately confirm whether each of the plurality of contents is the content of interest to the user. In an embodiment, that determining whether the content provided by the content provider to the user belongs to the content of interest to the user according to at least one of the user's personalization information and the user feedback information may be implemented by a neural network. As an example, FIG. 6 shows a schematic diagram of a method for determining whether each content provided by the content provider for a user belongs to the content of interest to the user. The NLU module shown in the dashed box may be used to interpret the user feedback information, and the personalization information knowledge base shown in FIG. 6 may be used to interpret the user's personalization information, for example, from the user's personal knowledge graph. In this example, for the user's personalization information, a representation network may be used, such as a recurrent neural network (RNN) shown in FIG. 6, or a convolutional neural network may be used, or a multi-attention network with a self-attention mechanism may be used to obtain an information representation vector corresponding to each personalization information; $e_i$ (i=1, 2, . . . , k) shown in FIG. 6 corresponds to one piece of personalization information, for example, by using a triple (i.e., two entities and a relationship between two entities) in a knowledge graph to represent one piece of personalization information, each personalization information may be represented by one personalization information submap, two nodes of the submap may correspond to two entities, and an edge between nodes may correspond to a relationship between the two entities. Each piece of the personalization information may be used as an input to the RNN. By the RNN, the representation vector corresponding to each piece of personalization information (i.e., the representation vector of the personalization information submap shown in FIG. 6) may be obtained, then the information representation vector corresponding to the respective pieces of personalization information may be combined to obtain a combined represent vector (the knowledge base representation shown in FIG. 6, which may also be referred as a knowledge base representation vector).

In this example, for the processing of the user feedback information, that is, the NLU module illustrated in a dashed box in FIG. 6, the input of this module is the text (word) contained in the user feedback information $x_i$ (i=1, 2, . . . , n), and for the processing of text, $x_i$ (i=1, 2, . . . , n) is encoded into a serial of implicit vectors by using the RNN, such that these implicit vectors are combined together to be used as the output of the intention recognizer to finally obtain the corresponding intention. At the same time, these implicit vectors are also used as inputs of the multilayer perceptron (MLP) to recognize and obtain the labels contained in the user instruction information, and these intents and the labels corresponding to each $x_i$ are used to obtain the intents and the representation vectors corresponding to the labels (the representation vectors corresponding to the user feedback information) through a neural network (e.g., RNN) or a look-up table.

For each content provided by the CP, each content may be encoded, wherein the encoding process may be performed by using a common neural network in the field of computer version, such as ResNet. During the encoding processing, the content representation vector corresponding to each content with unified length may be output by means of vector embedding. After completing the above processing, the weight of each content representation vector may be determined based on the representation vector corresponding to the user feedback information and the combined representation vector corresponding to the user's personalization information. Then the combined content representation vector may be obtained by means of weighted sum or other combination methods based on each content representation vector and the weight of each content representation vector. For example, the combined content representation vector may be obtained by means of the weighted sum, as following equation:

$$R = \sum_{i=1}^{m} \alpha_i \cdot r_i$$

According to an embodiment, R represents the combined content representation vector, m is the number of content representation vectors, that is, the number of items of the contents provided by the CP, and $\alpha_i$(i=1, 2, . . . , m) is the weight of the $i^{th}$ content representation vector, $r_i$ is the $i^{th}$ content representation vector.

According to an embodiment, the weight $\alpha_i$(i=1, 2, . . . , m) may be obtained by calculating the knowledge base representation vector, the representation vector corresponding to the user feedback information and the respective recommended content representation vector $r_i$(i=1, 2, . . . , m) together, and the calculation method may be the point multiplication as following equation:

$$\alpha_i = r_i \cdot v$$

Or it may be calculated by using MLP after splicing based on following equation:

$$\alpha_i = MLP(r_i \cdot v)$$

According to an embodiment, v represents a combined vector of the knowledge base representation vector and the representation vector corresponding to the user feedback information (the combination method may include, but is not limited to, splicing, averaging, or weighted averaging, or a maximum pooling, etc.), which may be obtained by splicing or other combination methods. Certainly, when determining whether the content provided by the CP is the content of interest to the user based on the user feedback information or the user's personalization information, then represents the knowledge base representation vector or the representation vector corresponding to the user feedback information.

Based on the obtained combined content representation vector, the neural network may be used to determine whether each content provided by the CP belongs to a content of interest to the user. Specifically, in this example, the slot tagging may be implemented through the RNN network, and the role of the network may perform one slot tagging task and output the tagged sequence of the recommended content. Specifically, each content provided by the CP may be considered as one sequence, then each element in this sequence is tagged. The tag represents whether the current element is suitable, that is whether it is the content of interest to the current user. While using the conventional RNN to implement the slot tagging, R in the above formula and the respective content representation vectors are input to the RNN as the initial state, then each content representation vector is tagged through the RNN and based on R, then the distribution probability (one probability corresponds to one content representation vector, that is, corresponds to one content) of the slot tags in the time steps is calculated by using output of each time step, and it is finally determined that whether each content is related to the user's preference, that is whether belongs to the content of interest to the user, for example, configuring one probability threshold according to an empirical value and/or an experimental value, determining the content corresponding to the distribution probability which is not less than the probability threshold as the content of interest to the user, and determining the content corresponding to distribution probability which is less than the probability threshold as the content of disinterest to the user. It is tagged, whether each content provided by the CP, in the slot tagging of the recommended content.

For example, the user searches for a product on the e-commerce website A, and then the user purchases the product on the e-commerce website B. In prior art, the CP of the e-commerce website A may not be aware that the user has already purchased the product. When the user subsequently logs in the e-commerce website A, the CP of the e-commerce website A considers that the user is still interested in the product, and may keep pushing the relevant contents of the product to the terminal device of the user, so that the contents pushed to the user are inaccurate, thus reducing the user's experience. Through the embodiments of the disclosure, the terminal device may be aware of the user's accurate personalization information in real-time. When the user has already purchased the product on the website B, and the user's personalization information may be changed or updated, the terminal device may provide the user's changed or updated personalization information to the CP of the website A such that the CP of the website A may update a corresponding user profile, and then the CP of the website A may not continue pushing the relevant contents of the product according to the received user's personalization information, thereby realizing the accurate pushing of the content and reducing the inaccurate pushing, which improves the user's experience.

For another example, a user with a child at home has purchased some baby milk powder on an e-commerce website before, the user may no longer need such infant-products for now, but may need some preschollers-products, such as toys, or stationery. However, the e-commerce website may not know the user's accurate needs. In the embodiments of the disclosure, after the terminal device detects that the user's current needs are changed from the baby milk powder to preschollers-products including a toy or stationery, the terminal device may provide the user's personalization information to the CP of the e-commerce website, then the CP of the e-commerce website may succeed in pushing relevant content to the user's interest or needs, which improves the user's experience.

For another example, when the user has purchased the product A on an e-commerce website, the CP of the e-commerce website may consider that the product A is the content of the interest to the user, such that the relevant content of product A may continue to be pushed subsequently. However, the user may not be satisfied with the product A, and may not want to continue paying attention to relevant contents of the product, for example, the user may say that he or she does not like product A in a con-versation with another user. In the embodiments of the disclosure, after the terminal device detects such user feedback information regarding the content provided by the CP, the terminal device may provides the user's updated personalization information to the CP of the e-commerce website, such that the CP may stop pushing relevant contents of the product A, which reduces the inaccurate pushing and improves the user experience.

In an embodiment, the operation of providing the user's personalization information to the CP, may include: performing a corresponding user activity simulation operation based on the personalization information to be provided to the CP in the user's personalization information.

When the user's personalization information is provided to the CP, the terminal device may interact with the CP to provide the user's personalization information to the CP. According to an embodiment, one optional method may be to directly use an application programming interface (API) provided by the CP when the CP has its API opened. Another optional method may be to implement interaction with the CP by simulating a user activity, that is, performing the corresponding user activity simulation operation based on the user's personalization information to provide the user's personalization information to the CP. According to an embodiment, according to actual needs, the two optional methods may be used independently or may be used in combination. Here, the user activity may be referred to as a user behavior.

According to an embodiment, the personalization information to be provided to the CP in the user's personalization information may be all the user's personalization information, or may be a part of personalization information determined based on the user's personalization information, or information requested by the CP, wherein the determined personalization information may be necessary for the CP to provide personalized contents to the user, for example, the personalization information to be provided to the CP may be non-sensitive personalization information in the user's personalization information. The personalization information to be provided to the CP may be filtered based on configured screening condition of the user or the user's manual selection, which the screening condition may be pre-configured, or may be configured by the involvement of the user.

As an example, a schematic diagram for providing personalization information based on an API is shown in FIG. 7, and the key information shown in FIG. 7 may represent personalization information necessary for the CP to personalized contents to the user. An API of the CPI may be used to provide the key information. The specific implementation method may be to convert the key information that needs to be provided to the CP into a series of API invoking statements by using a series of rules, and then provide the key information to the CP by means of invoking the API. For this method, when the CP has APIs opened, some suitable APIs (i.e., target interface) are selected based on the personalization information to be provided to the CP, then the key information to be provided to the CP is converted to the API invoking statements, and the key information is transmitted to the CP through these target interfaces to be used as the personalization information by the CP to provide a personalized content to the user.

In an embodiment, the foregoing operation of performing the corresponding user activity simulation operation may include: determining a user activity simulation operation corresponding to the personalization information to be provided to the content provider in each predetermined user activity simulation operation; performing the determined user activity simulation operation.

According to an embodiment, each predetermined user activity simulation operation may include a feedback operation of content provided by the CP to the user.

When providing the personalization information to the CP by performing the corresponding user activity simulation operation, that is, when interacting with the CP by simulating the user activity, one method may be that simulating the user activity through the user feedback method provided by the CP. In other words, the user activity simulation operation may be at least one operation in the feedback operation of content provided by CP for the user, that is providing information that needs to be provided to the CP to the CP through the content feedback method provided by the CP. For example, the terminal device may automatically learn a button provided in contents by the CP, such as, "X" button for closing ads which is hard to recognize or click for users sometime and may be referred to as a hiding button herein, and then feedback information that needs to be provided to the CP through the button. Another method is to simulate the user activity by means other than the feedback method provided by the CP. In other words, the respective predetermined user activity simulation operations may further include operations that are not feedback operations provided by the CP for the user. For example, various user activity simulation operations may be planned according to the actual needs. For example, the planned user activity simulation operation may include an operation that simulates a click on contents, and by performing the operation, certain information may be provided to the CP as same with one when the user really clicks on contents. The two methods are described below respectively.

The first method is to simulate the user activity based on content feedback operation provided by the CP for the user. When employing this method, the content feedback method provided by the CP to the user may be collected and stored.

Specifically, a CP explorer may be established for a CP client (such as an application) corresponding to each CP, that is, to search for an operation or button for collecting user feedback, on the interface of the client of the CP, then simulating an operation activity for the user with respect to the button according to key information to be provided to the CP and interacting with the CP by a method for collecting user feedback (e.g., hiding button).

As an example, a flowchart diagram in one method is shown in FIG. 8. As shown in FIG. 8, the CP explorer (which may be a functional module for collecting the user feedback) may determine a method for collecting user feedback provided by the CP in advance, or may generate a series of interactions with the CP to identify all possible buttons and their functions of the CP and search for channels or buttons for providing the user feedback to the CP, and then may generate a serial of feedback collection methods (i.e., the user feedback operation), wherein these feedback collection methods may provide subsequent processing steps in a form of a list. A menu manager (for determining a corresponding user activity simulation operation based on the personalization information to be provided to the CP, that is for determining which user feedback collection methods should be used) may be used. Inputs received by the menu manager may be the key information to be provided to the CP and the list of the feedback collection methods corresponding to the CP. After receiving the above input, the menu manager may plan a corresponding menu path according to the predefined rules. For example, many Apps corresponding the e-commerce websites may provide some buttons to the user for hiding some recommendations. When the terminal device determines that the user may not like some contents provided by the CP, it may first simulate the user to click a corresponding button, then select, determine and return the updated user information to the CP. Specifically, it may select a suitable feedback collection menu, and then plan a serial of simulated clicking (i.e., the above responded user activity simulation operations) and send the planed simulated clicking to the user simulator (a functional module for performing the user activity simulation operation). After receiving the above planned activities, the user simulator may perform these ac-tivities, for example, step by step, which simulates the user activities, and provide in-teraction with the CP by using the above user feedback collection method.

For example, a general e-commerce website may provide users with some feedback buttons, through which the user may cancel some pushed contents and inform the CP of the reason for cancellation. The CP explorer then learns the locations and functions of these buttons and simulates a click on these buttons in conjunction with the user's personalization information.

The second method is to simulate the user's usage activity based on other methods in addition to the feedback method provided by the CP. As an example, FIG. 9 shows a schematic flowchart of this method. As shown in FIG. 9, a user activity planner (a functional module for determining user activity simulation operations (i.e., planning which user actions should be performed)) may be used. Specifically, input received by the user activity planner may be information to be provided to the CP (i.e., the key information, and key personalization information may be referred to as the key information), these pieces of key personalization information may be presented in the form of triples (entity, relationship, entity) in a knowledge graph, for example, (mop, color, red). After receiving these inputs, the user activity planner may plan which user actions should be performed (i.e. user activity simulation operations), and provide the planned user activities to the user simulator. The user simulator may perform the planned actions after receiving the planned user activities. For example, when the CP corresponding to the e-commerce website pushes some products (e.g., toys) to the user, but the user may not like the toy, the user activity planner may plan a serial of actions (e.g., selecting clothes in recommendation by clicking it and searching for various clothes) according to the user's real interest or preferences (e.g., clothes). The products that are of real interest to the user that may be returned to the CP by performing these planned actions.

For example, when the terminal device may detect that the user is no longer in-terested in the product A recommended by the CP, the user activity planner may plan a series of user operations according to the updated user's personalization information, and these operations may include actively selecting and viewing products of interest to another user other than product A. After receiving these user's operations, the CP may aware that the user is not interested in the product A.

It should be understood that several methods for providing personalization information to be provided to the CP, to the CP, provided by the embodiments of the disclosure may be used independently or in combination.

As an optional method, based on the personalization information to be provided to the CP, in each predetermined user activity simulation operation, that determining a user activity simulation operation corresponding to the personalization information to be provided to the CP may be implemented by a neural network.

In an embodiment, after performing the corresponding user activity simulation operation based on the personalization information to be provided to the CP, when the new content provided by the CP is received, the method may further include: performing an operation of providing the user's personalization information to the content provider repeatedly until a predetermined condition is met.

As an example, FIG. 10 shows a schematic diagram of three methods that the above terminal device interacts with the CP (providing the personalization information to the CP by API, providing the personalization information to the CP by performing the content feedback operation provided by the CP, or providing the personalization information to the CP by performing the user activity simulation operation other than the content feedback operation provided by the CP). In this example, the personalization information to be provided to the CP is all or partial information of the user's personalization information.

As shown in FIG. 10, the key information extractor (a functional module for determining the key personalization information which may be implemented by a neural network) may be used to determine that information to be provided to the CP in the user's personalization information as the key information. Specifically, as shown in FIG. 10, $e_i(i=1, 2, \ldots, n)$ may represent user's personalization information, which may also be the respective entities in all the personalization information. In this example, taking $e_i(i=1, 2, \ldots, n)$ as an entity as example to demonstrate that the entity may include the user's age, the user's nationality and the location, the representation vectors of all the entities in the user's personalization information extracted by the key information extractor. These entities may be converted to some representation vectors after the operation of extracting the personalization information. Then these representation vectors may be subjected to an RNN based on gated recurrent unit (GRU). Due to the RNN, the RNN units between different entities are connected, and the output of the GRU in each time step may be input into the MLP. Finally, it may be predicted that each entity should be contained in the finally extracted personalization information, that is, "yes" shown in FIG. 10 indicates that the corresponding entity should be contained in the key information, and "no" indicates that the corresponding entity is not contained in the key information. The personalization information corresponding to these entities is the personalization information to be provided to the CP based on all determined entities contained in the key information. After extracting the key information, the suitable method for interacting with the CP may be selected according to the current state, such as a first type of method may be selected when the CP has an suitable API to be opened; when the CP provides a feedback reception button, then the key information is provided to the CP based on the content feedback method provided by the CP; the method of self-planning user activity simulation operation may be selected in most cases.

Specifically, when selecting the method of invoking API (the method 1 shown in FIG. 10), then the representation vectors of the key information (the key information representation in FIG. 10) may be used to select an API label to be invoked by rules or by a neural network (i.e., determining the target API interface and invoke it). When implementing by selecting the content feedback method (the method 2 shown in FIG. 10) provided by the CP, then a similarity matrix between the key information representation and the menu representation may be calculated, that is calculating a similarity matrix using a matrix consisting of representation vectors corresponding to all the key information, and a matrix consisting of representation vectors of all menus (i.e., feedback method), and then the obtained similarity matrix may be subjected to several convolution operations to determine whether to invoke each menu (i.e., the user feedback method) through a GRU-based RNN, and determine the menus to be invoked to form a menu sequence. The third method uses a frame based on reinforcement learning, that is, selecting suitable operations based on a content displayed on the current screen. These suitable operations are selected from the predefined action 1 to action n. These actions may include sliding screen, clicking screen and automatically issuing voice instructions. According to an embodiment, after the corresponding action has been performed, when the screen state updates (i.e., the CP returns the new recommended content), then a suitable operation is selected again according to the updated screen state to perform a next iteration until the CP stops pushing inaccurate contents or until the number of the iteration reaches a predetermined value. Certainly, for method 1 and method 2, when the new content provided by CP is received after the key information is provided to CP, it may be possible to repeatedly perform the operation of providing the user's personalization information to the CP.

In an embodiment, the above corresponding user activity simulation operations may include:

user activity simulation operation characterizing that the provided content is the content of interest to the user; and/or user activity simulation operation characterizing that the provided content is the content of disinterest to the user.

The user's personalization information is provided to the CP in order to enable the CP to obtain more accurate user's personalization information to build a better user profile for the user, that is, to enable the CP to better understand the user's preferences. Therefore, while performing the corresponding user activity simulation operation, information about the content of interest to the user may be notified to the CP by these simulation operations, and information about the content of disinterest to the user may also be notified to the CP.

According to an embodiment, the user activity simulation operation characterizing that the provided content is the content of interest to the user, may includes at least one of the following:

click operation, browse operation, search operation, favorite operation, attention operation, purchase operation and voice input operation; and/or the user activity simulation operation characterizing that the provided content is content of disinterest to the user, may include at least one of the following:

block operation, delete operation, close operation, cancel favorite operation, cancel attention operation and voice input operation.

In an embodiment, the terminal device may actively perform a corresponding user activity simulation operation based on the personalization information to be provided to the CP, and by performing the model operation, a content of interest to the user and/or a content of disinterest to the user may be provided to the CP, so that the CP may obtain the latest and accurate user's personalization information, and the CP may provide more accurate content to the user and avoid providing the user with inaccurate content, and the terminal device actively performs simulated user activities without any actual operation by the user. Therefore, the user's experience is greatly enhanced and the actual needs are better met.

In an embodiment, the operation of providing the user's personalization information to the CP, may include:

determining information to be provided to the content provider from the user's personalization information; and providing the determined information to the content provider.

According to an embodiment, According to an embodiment, the operation of determining information to be provided to the CP, may include at least one of the following:

when the user's personalization information is changed, determining the information to be provided to the CP according to the changed personalization information of the user;

determining a content of interest to the user in the user's personalization information, and determining the information to be provided to the CP according to the content of interest to the user;

determining a content of disinterest to the user in the content provided by the CP to the user, and determining the information to be provided to the CP according to the content of disinterest to the user.

When determining the information to be provided to the CP, in response to the changed personalization information in the user's personalization information, corresponding information may be provided to the CP according to the changed personalization information of the user, so that as soon as the user's personalization information is changed, the CP may obtain the latest personalization information. In addition, since the purpose of providing the personalization information to the CP is to enable the CP to better understand the user's personalization information, that is, the user's preferences, the information to be provided to the CP may be determined based on the content of interest to the user and/or the content of disinterest to the user.

In an embodiment, the terminal device may determine a content of interest to the user according to the stored user's personalization information, and provide the content of interest to the user to the CP as the key information.

In an embodiment, the operation of determining the personalization information to be provided to the CP according to a content of disinterest to the user, may include:

determining the content of interest to the user associated with the content of disinterest to the user based on the user's personalization information;

determining the personalization information to be provided to the CP based on the determined content of interest to the user.

In other words, based on the user, it may be determined that the content that is associated with the content of disinterest to the user but belongs to the content of interest to the user, and the personalization information corresponding to the associated content of interest to the user is acted as the personalization information to be provided to the CP. As an optional method, contents which are similar to the contents of disinterest to the user and belong to the content of interest to the user may be matched in the user's personalization information database based on the content of disinterest to the user. Then these contents may be acted as the information to be provided to the CP. In an embodiment, the above matching process may use a general database retrieval method, that is, using a formatted retrieval statement to perform retrieval in the personalization information database.

As an example, for example, an e-commerce website CP may provide the user with some contents about the "mop", but the user is not interested in the content, then the product of interest to the user may be queried in the category of the product to which the "mop" belongs and return to the CP. For example, "mop" belongs to the category of "household goods", and the user is interested in "washing powder" in the category of "household goods", therefore this personalization information may be returned to the CP.

In addition, it should be also noted that since some user's personalization information is sensitive to the user, that providing sensitive information to the CP may reveal user privacy and reduce the user's usage experience. Therefore, the information to be provided to the CP may be desensitized first, and then based on the desensitized personalization information, corresponding information may be provided to the CP through an API interface or by simulating the user operation.

In other words, before the terminal device interacts with the CP, which personalization information is user's sensitive information may be recognized, and recognized sensitive information may not be provided to the CP. Specifically, the sensitive information filtering operation may be used to filter the sensitive information not to be provided to the CP in the current scenario. In an embodiment, all the personalization information to be provided to the CP may be input into a sensitive information filter, in which these pieces of sensitive information are desensitized, and then the desensitized personalization information may finally output and used thereafter. This desensi-tization process may use a predefined rule: first defining (may be predefined by the user) some unrevealed sensitive information, and deleting the key information containing these pieces of sensitive information to finally obtain the desensitized information. For example, when the user is interested in painting, then the terminal device detects that the user is interested in painting according to the user's daily ac-tivities. However, when the user may not want the CP knows his or her preferences, the painting is set to be the privacy data, and then the desensitized personalization information may not contain this type of information that users like painting.

It should be understood that, the terminal device may provide a privacy setting function option to the user, so that the user may set a filtering rule or filtering extent how much sensitive information to be filtered according to the user's actual needs. According to an embodiment, the specific configuration of the privacy setting function option may be configured according to the actual needs, which is not limited by the embodiment of the disclosure.

In an embodiment, the user may occasionally search for a certain content or purchase a certain product for another users, for example, as a gift for the other user, then the corresponding CP may establish inaccurate personalization information according to the user's search behavior or purchase behavior. It may be considered that the searched content or the purchased product is the content that the user pays attention to, and relevant content may be kept pushed to the user when the user uses a corresponding application. For example, a user may buy a friend some products on an e-commerce website, and the e-commerce website may inaccurately label the user according to the purchase records, and considers that the user is interested in the product. When the user subsequently logs in the e-commerce website, the CP of the e-commerce website may still push the relevant contents of the product to the user's terminal device, so the recommended product may not be of interest for the user, thereby reducing the user's experience.

In an embodiment, the terminal device may collect another user's personalization information according to the user's need, and may share suitable personalization information between users according to the user's request and authentication of the other user, and provides the other user's personalization information to the CP as the user's personalization information. For the CP, the other user's personalization information may be used as the user's personalization information, then contents of interest to the other user may be also pushed to the user, and the user may select suitable contents among contents pushed by the CP; although the terminal device obtains the other user's personalization information and provides it to the CP for temporal use, the terminal device still may not consider that the user's personalization information is changed and may not update the user's personalization information, then the user's personalization information remain unchanged.

In an embodiment, the operation of obtaining user's personalization information may include:

obtaining the user's personalization information corresponding to another user from another terminal device.

In an embodiment, the user of the current terminal device may obtain personalization information of another user (hereinafter referred to as a target user for convenience of description), such that a more suitable service content may be selected for the user based on the above, for example, for the user to purchase a gift to the target user. Certainly, the current terminal device may also send the user's personalization information from the terminal device to another user, so that the other user may use preferences of the user.

After the target user's personalization information is obtained at the user's terminal device, the target user's personalization information may be changed, so that the target user's personalization information may be provided to the CP, and may be provided to the CP in the manner of invoking the API interface or by simulating the user operation.

For example, when a user wants to buy a gift for a family member or a friend, but is not sure of the preferences of his or her family member or friends, the user may obtain another user's (e.g., the above-mentioned family member or friend) personalization information according to an embodiment, so that the corresponding processing may be performed subsequently based on the obtained the corresponding user's personalization information.

In an embodiment, the method may further include: determining and presenting a content of interest to the other user based on the other user's personalization information.

In other words, after the target user's personalization information is obtained, the content of interest to the other user may be further determined and presented to the user corresponding to the current terminal device based on the obtained personalization information of the other user, so that the user corresponding to the current terminal device may select a gift for the other user on the basis of knowing the content of interest to the other user.

In order to better ensure the privacy of the user, it may be understood thatauthen-tication information between users, or authentication information of the other user may be used for constructing an authentication system, such as a range of information allowed to be shared among the users, a user who is allowed to share, and the like. The terminal device may record the authentication information between the users or the other user. When receiving the request for the user to obtain the content of interest to the other user, or when sending the user's personalization information to the other user's terminal device, it may be granted by the authentication system first or by the other user As an example, FIG. 11 shows a schematic flowchart of obtaining a target user's personalization information, where the user A wants to know the user B's personalization information. When the user A wants to know the user B's personalization information, the user A may issue a voice instruction (the voice input shown in FIG. 11) to a terminal device A, and the terminal device of the user A may first use the NLU module to parse the intent of the instruction after obtaining the voice instruction, and determine the target user (i.e., the user B) according to the intent (i.e., searching for the target user shown in FIG. 11), to obtain personalization information from the target user (i.e., searching for the entity shown in FIG. 11, the entity shown in FIG. 11 is used to represent the target user's personalization information). Then, the terminal device of the user A may send a personalization information acquisition request to the terminal device B of the target user B to obtain the target user B's personalization information (i.e., obtaining the personalization information submap shown in FIG. 11). After the request is received by the terminal device B, the terminal device B may first determine whether the user A has the authority to obtain the user B's personalization information based on the authentication system corresponding to the user B. When the user A has the authority, or the user B has granted the request, then after passing the authen-tication of the authentication module (i.e., the shown authentication management part, that is the authentication system), the terminal device B may search for the corresponding personalization information submap in the personalization database belonging to user B, and shares the user B's personalization information submap with A. According to an embodiment, the operation performed in the specific authentication process by the authentication module may be a rule matching, that is, that determining whether one personalization information submap corresponding to B may be shared with A by using a predefined user authentication information.

In an embodiment, each user's personalization information may be stored as client data of each user, or may be stored in cloud. When searching for a certain user's personalization information, the database retrieval technology may be employed in the cloud or in the client database, for example, retrieving the database by using a retrieval statement related to the instruction.

In an embodiment, the operation of determining the content of interest to the other user based on the other user's personalization information may include:

sending an operation request to the corresponding CP through the corresponding CP client based on the other user's personalization information; receiving response information returned by the corresponding CP based on the operation request, the response information being the content of interest to the user for the other user; and/or determining the content of interest to the other user based on the personalization information of the other user; and/or, obtaining user association information of the other user, wherein the user association information includes user's relevant information; and/or, determining the content of interest to the other user according to the other user's personalization information and the user association information based on the information obtained from the other user's personalization information.

According to an embodiment, the user relevant information in the user association information may include, but is not limited to, information associated with the user obtained from the current terminal device, such as communication information associated with the user stored in the current terminal device, specifically such as text message, voice interaction information and the picture and the like. However, the information obtained based on the other user's personalization information may include, but is not limited to, the other user's personalization information, and response information returned by the CP and obtained by transmitting an operation request to the corresponding CP through the corresponding CP client, and may also include the content of interest to the other user determined based on the other user's personalization information.

Specifically, after obtaining the other user's personalization information, in order to provide the user corresponding to the current terminal device with the content of interest to the target user (i.e., the other user), one optional method may be to provide the obtained personalization information of the other user to the CP, receive content provided by the CP based on the other user's personalization information, and provide the content provided by the CP as a content of interest to the target user; another optional method may be that the terminal device directly determines the content of interest to the target user based on the obtained personalization information. another optional method may be that, after the terminal device actively collects the target user's association information, the terminal device may determine the content of interest to the target user based on the received information and obtained personalization information.

According to an embodiment, after determining the content of interest to the other user according to the other user's personalization information or according to the other user's personalization information and the association information, a corresponding interest template may be determined based on these pieces of information in the pre-configured interest template database. The determined content in the interest template may be directly used as a content of interest to the target user, or the post-processing may be performed based on the determined content in the interest template to obtain a content of interest to the target user As an example, FIG. 12 shows a schematic diagram of a method for determining the content of interest to the user based on the other user's personalization information (the personalization information shown in FIG. 12) and the user association information (the external resource shown in FIG. 12). As shown in FIG. 12, the interest content template (i.e., the response generation template shown in FIG. 12) is determined according to the other user's personalization information and the user association information, and then a response generator may convert content in the template into text, and the text may be converted by the voice conversion module (a text-voice conversion module shown in FIG. 12) to voice, and a content of interest may be presented to the user corresponding to the current terminal device in form of voice In an embodiment, a content of interest to the other user corresponding may be determined according to the other user's personalization information and the user association information by a neural network.

As an example, FIG. 13 shows a schematic diagram of a method of determining the content of interest to the target user, wherein the authorization database shown in FIG. 13 corresponds to the target user's authentication system, and when the other terminal device provides the target user's personalization information to the current terminal devices, it may pass the authentication of authentication system of the target user therebefore. As shown in FIG. 13, in this example, a neural network may be first used to represent all the obtained target user's personalization information (i.e., the target user's personalization information) as one vector v. This example shown one process of obtaining by using the RNN structure, wherein $e_i$ (i=1, 2, . . . , n) are the respective entities and relationship in the target user's personalization information submap (i.e., the respective target user's personalization information), $h_i$ (i=1, 2, . . . , n) is the implicit vector of the RNN obtained in each time step, and the representation vector v (the rep-resentation vector of the target user's personalization information) of the personalization information submap may be obtained after combining all $h_i$ (i=1, 2, . . . , n). This combination process may use averaging, splicing, weighted averaging, maximum polling and the like, but not limited thereto.

The external resource shown in FIG. 13 may be the target user's user association information. In this example, a representation vector of each external resource may be modeled by using a convolutional neural network (CNN). After obtaining the representation vector of each external resource and combining with v, and then the classifier may be used to obtain a label corresponding to each external resource. The com-bination referred here may be splicing, averaging or maximum pooling and the like. The classifier referred herein may be a multi-layer perceptron, a classifier based on CNN or based on RNN, or a classifier based on algorithms such as a support vector machine and a decision forest.

After obtaining the label corresponding to all the external resources, it may be input into the existing interest template database (also referred to as a template data set), and then the suitable response template in the template database is retrieved. In order to improve the diversity of the response content, the response statement generated based on the template may be rewritten. This rewriting process may use a sequence-to-sequence-based framework. Specifically, each text character $t_i$ (i=1, 2, . . . , n) in the template may be converted into some implicit vector representations $h_i'$ (i=1, 2, . . . , n), and then the implicit vector representations are subjected to be combined and decoded to generate the feedback content. Specifically, after the respective implicit vector rep-resentations $h_i'$ shown in FIG. 13 are combined, each text character in the feedback content $r_i$ (i=1, 2, . . . , n) is obtained after decoding through a neural network, so as to obtain the feedback content based on each text character, wherein the feedback content is the determined content of interest to the target user. The combination process referred herein may be averaging, or weighted averaging or the maximum pooling. Finally, the content of interest to the target user may be presented to the current user in form of voice playing and/or text displaying.

It may be understood that the use process of each neural network model is shown in FIG. 13. In an embodiment, the training data may be used to train the initial neural network model before using the neural network model, and the training data may be used to obtain the corresponding loss function in the training process, and then the backpropagation algorithm may be used to update the parameter of the model.

According to an embodiment, the initial neural network is iteratively trained based on the training data to obtain a network model that satisfies the training ending condition. Specifically, during each training, a loss function of the neural network model may be used to determine whether the training of the model may be completed, for example, determining whether the loss function is in a convergence state. When it is in a convergence state, the training may be stopped, and the model that satisfies the state is acted as a model. Otherwise, the parameters of the model may be re-optimized and updated, and perform the training based on the training data again until the loss function satisfies the convergence state. The training model may output more accurate information during applying the model so as to avoid the problem that the deviation of the final required data processing result based on the output is too large due to the large deviation of the model output.

In an embodiment, the operation of obtaining user's personalization information may include: obtaining user identification information; and, obtaining the user's personalization information based on the user's user identification information.

In an embodiment, it may be possible that multiple users use the same account to access the CP server, in other words, the same account may be shared among different users, for example, the child may use the parent's mobile phone to search for content, or the user A may occasionally use user B's account to search for content or purchase products on the user A's device, and the CP server may be unable to accurately recognize a specific user currently using the device, thus resulting that the content pushed to the user is inaccurate and the user's experience is reduced. For another example, when a user wants to purchase a gift for a family member or a friend, the user's personalization information needing to be provided to the CP by the terminal device should belong to the user's family member or friend. In other words, the personalization information required to be obtained by the terminal device is another person's personalization information rather than the personalization information of the user who currently uses the device.

In an embodiment, the terminal device may store the multiple users' personalization information to obtain the user's personalization information corresponding to the iden-tification information based on the obtained identification information. When the user corresponding to the iden-tification information coincides with a user who is currently using the terminal device, then the personalization information of the user who is currently using the terminal device is obtained. When a user corresponding to the obtained identification information does not coincides with a user who is currently using the terminal device, that is, the user corresponding to the obtained identification information is another user, the personalization information of the other user is obtained to be provided to the CP. For example, when the terminal receives a user voice instruction "I want to buy my mother a gift", "mother" in the instruction may function as the identification information, the personalization information of the user (i.e., "mother") may be obtained, so that it is possible to provide the personalization information of the actual required application to the CP, such that the CP may provide contents based on the obtained personalization information.

Specifically, the terminal device may monitor the actual user of the device in real time to obtain the identification information, and switch the personalization information of the corresponding user according to the actual user corresponding to the identification information. When detecting the actual user of the device, the received input may include, but is not limited to, voice, image, fingerprint, heartbeat, account information of the CP user and the like, in other words, the user's identification information may be one or more of the information. For example, when user 1 uses user 2's mobile phone, the mobile phone may detect that the usage habit or pattern of the current mobile phone user has changed, or find that the current user has changed through a signal monitored by a sensor such as a camera, a microphone and the like, and then the mobile phone may interact with the CP based on the personalization information of the new user.

As an example, as shown in FIG. 14, the terminal device may detect the current actual user based on sensed output information (voice, image, fingerprint, heartbeat, etc.) from different sensors of the device by using different classification algorithms. It may be seen from the foregoing description that multiple sets of user personalization information databases may be maintained on the current terminal device, in other words, one terminal device may store multiple user's personalization information. The terminal device obtains the corresponding personalization information according to the obtained identification information, so as to interact with the CP based on the obtained identification information and the personalization information corresponding to the obtained identification information, so that the CP may obtain the personalization information that the user really wants the CP to obtain.

Currently, a user may also switch different users' personalization information by actively issuing a user instruction. In other words, when the terminal device receives a user's switch instruction, the terminal device may determine the current user based on this instruction. At this time, the user's switch instruction is the obtained identification information.

For an example, as shown in FIG. 15, the user may issue a voice instruction to implement the switching between different personalization information. When the user issues a voice instruction, the terminal device converts the voice instruction into text after receiving the voice instruction, and sends it to the NLU module. The NLU module may parse these instructions, and then input the intent and slot information contained in these instructions into the subsequent state prediction network (may be specifically implemented by the neural network), and the subsequent state prediction network may obtain the representation of the current state with the help of the personalization information database, that is, predicting the probability whether each user is the current user through the state prediction network based on the output of the NLU module (the information to be output represents the current usage state of the device), in other words, predicting the probability which user is using the terminal device according to the current usage state. The output of the state neural network is each user label predicted according to the current usage state of the device (i.e., the probabilities of the above different users). The user corresponding to the maximum probability may be predicted as the current actual user according a prediction result, and whether to switch the current user's personalization information is predicted according to this rep-resentation. When the prediction result indicates that the user corresponding to the current user identification information has been changed, then the terminal device may use the user's personalization information corresponding to the current user identi-fication information to interact with the CP by a CP management module for in-teracting with CPs.

In an embodiment, the method may further include: updating corresponding information in the user's personalization information according to a modification in-struction for the user's personalization information; and/or, determining whether to update the user's personalization information based on each content provided by the CP for the user, feedback information form of the user on the at least one content provided by the CP, and the user's personalization information.

In an embodiment, the real-time modification of the user's personalization information may be realized, so as to better meet and perfect the user's personalization information.

In an embodiment, the user may also issue an explicit instruction to change its own personalization information database. In the example shown in FIG. 16, for example, when the user wants to set his or her age to 25, the user may explicitly issue the voice instruction by saying "change my age to 25". After receiving the instruction for changing the user's personalization information, the terminal device may parse the received instruction to obtain the user's intent, such as "change age" by the NLU module, and extract parameter information "25", then the terminal device may change, based on the parsed information, the intention and the parameter information in the user's personalization information database for modifying the user's personaliza-tion information, for example, in this example, the user's age is modified as 25 years old according to the user's personalization data.

In an embodiment, the terminal device may actively collect from the user feedback information on the content provided by the CP, and determine whether the user's personalization information to be updated based on the respective contents provided by the user and the user feedback information on the provided contents. Specifically, when it is determined that the user's personalization information is changed based on the user feedback information and each content provided by the CP, the user's personalization information may be correspondingly changed. For example, when finding that the user is no longer interested in a certain content based on the user's personalization information, the user's personalization information is correspondingly updated, and the updated user's personalization information is stored in the personalization information database.

In an embodiment, the operation of determining whether to update the user's personalization information based on each content provided by the CP to the user, feedback information from the user on the at least one content provided by the CP, and the user's personalization information, may include: determining the feedback information and the personalization information associated with the feedback information, based on the user's feedback information; and, determining whether to update the user's personalization information based on the user's feedback information, each content provided by the CP to the user, and the personalization information associated with the feedback information.

According to an embodiment, it may be determined, whether to update the user's personalization information, based on each content provided by the CP, feedback information from the user on the at least one content provided by the CP for the user, and the user's personalization information by the neural network.

Specifically, two entities and a relationship between the two entities may be used to represent one piece of personalization information in a knowledge graph. Corre-spondingly, the operation of determining whether to update the user's personalization information according to the user feedback information, each content provided by the CP for the user and the personalization information associated with the feedback information, may include: extracting entities and/or relationships in the user feedback information; extracting entities and/or relationships in each content provided by the CP for the user; determining an information representation vector corresponding to information to be updated based on the information to be updated. According to an cm-bodiment, the information to be updated may include the entities and relationships in the personalization information associated with feedback information, entities and/or relationships in the user feedback information, entities and/or relationships in each content provided by the CP for the user; determining each updated label based on the information to be updated and the information representation vector corresponding the information to be updated, wherein one updated label may be used to recognize identify one updating method of the personalization information; and determining whether to update the current user's personalization information according to each label to be updated.

Specifically, the obtained user feedback information, each content provided by the CP for the user, and user's personalization information in the personalization information database may be used as inputs to be input into the neural network to determine whether to update the user's personalization information based on the output of the neural network. For example, when the output of the neural network is a first identifier, it may indicates to update the user's personalization information, or the neural network may output a plurality of second identifiers, wherein one second identifier may indicate the updating method of one piece of personalization information, for example, newly adding one piece of personalization information, deleting one piece of personalization information, updating one piece of personalization information, and then a corresponding processing on the user's personalization information is performed based on each second identifier.

In an embodiment, one piece of personalization information may be represented as a knowledge graph by the triplet method shown in the foregoing, and the correction process of the personalization information knowledge base may use a knowledge base inference algorithm based on a knowledge map. This process may include two parts. The first part may be to incrementally train the representation vectors of respective entities in the knowledge map. The second part may be to use a dynamically-extracted path to determine the relationship between two entities. In the first key part, a real number vector is used to represent the respective entities and their relationship, and then the following loss function may be used to optimize the representation vectors of the respective entities during the training of the model:

$$L = \frac{1}{n}\sum_{i=1}^{n}(R(e_1^i) - R(r_{12}^i) - R(e_2^i))^2$$

According to an embodiment, L is the value of the loss function, n is the number of entities encountered during the training process, and R is a mapping function that maps the entity or the relationship to its representation vector, and $e_1^i$ represents the first entity of the $i^{th}$ triplet in the training data, and $e_2^i$ represents the last entity of the $i^{th}$ triplet in the training data, and $r_{12}^i$ represents the relationship contained in the $i^{th}$ triplet.

During operating this model, the loss function may be used to update the entity and relationship vector. When a triple is newly extracted, the corresponding loss function may be calculated by using the above formula, and then the backpropagation algorithm is used to update the representation vectors of entities and relationships.

The second key part of the correction process of the personalization information knowledge base is to use the dynamically-extracted path to determine the relationship between the two entities. The input of this process is the user's personalization information, the recognition results for the content provided by the CP, and the recognition result on the user feedback, and the output is a new knowledge base triplet; or it is not to perform an update operation, or to update a certain piece or some piece of personalization information in the user's personalization information, or to delete a certain piece or some piece of personalization information.

Specifically, the operation of extracting a new relationship between entities may use a framework of reinforcement learning. As an example, FIG. 17 shows a schematic diagram of the overall architecture for determining whether to update the user's personalization information. In this example, the state network shown in FIG. 17 may use the RNN, certainly other network which may model the sequence may be used such as an implicit Markov model.

The main function of the state network is to capture the current state representation, and the input of the state network includes the recognition result collected in the current interaction process with the user. The recognition result may include entities and/or relationships contained in the feedback information, as well as entities and/or relationships in each content provided by the CP to the user, and may also include some other information associated with the personalization information. Then the triplet involved in these results in the user's personalization information may be retrieved, that is, retrieving the personalization information associated with the feedback information in the user's first personalization information database based on the user's feedback information, and using one real number vector to represent the entities and relationships in these triplets and the entities and/or relationships contained in the feedback information.

Specifically, $e_i$ (i=1, 2, ..., j) shown in FIG. 17 represents respective representation vectors corresponding to respective entities and respective relationships in the user's personalization information, respective entities and/or relationships extracted from the user feedback information, and the entities and/or relationships in the respective contents provided by the CP for the user, According to an embodiment, the neural network which obtains the respective representation vectors corresponding to the re-spective entities and the respective relationships is not shown. $e_i$ (i=1, 2, ..., j) is input to one RNN to obtain a serial of implicit vectors $h_i$ (i=1, 2, ..., j), and then the implicit vectors are combined to obtain one state representation vector (also referred to as state vector) which is the representation vector corresponding to the information to be updated.

The policy network shown in FIG. 17 may employ a feedforward neural network and an output layer (the Softmax layer shown in FIG. 17). The main function of the policy network is to select the suitable action according to the current state. The input of the network is the output of the state network, that is, the representation vector of the current state, and the entities and relationships currently encountered (entities and rela-tionships in the personalization information retrieved from the user's personalized information based on the user feedback information, entities and/or relationships extracted from the feedback information and the relationship and/entities in the re-spective contents provided by the CP for the user). The input passes through one feedforward neural network and is finally provided to the output layer to obtain the probabilities corresponding the respective contents. The action with the maximum probability is selected as the action needing to be performed in the current time step (i.e., the path shown in FIG. 17), which the path may represent the action output by the policy network in the current time step, such as adding the entities and filling in the content of the entity as "xxx" which is the actual content of the entity to be filled in, and the action may also refer to changing the relationship between two entities as "xxx". The selectable action set may include continuing along the current physical path or generating a new triplet. When selecting to continue along the current physical path, it indicates to update and should wait the next user interaction feedback and/or the modification instruction of the user's personalization information. When selecting to generate a new triplet, then corresponding modification is performed on the personalization information knowledge base such that the personalization information knowledge base covers the generated triplet.

According to an embodiment, the action to the state network may be provided every time the policy network outputs one action to make the state network to perform the further processing (the updated state shown in FIG. 17) based on the current output of the policy network. Specifically, for example, when the action currently output by the policy network is to continue along the current physical path, it indicates to update the personalization information. At this time, the state network may end the processing based on this action (i.e., ending the process of updating the personalization information), for another example, when the action currently output by the policy network is to add a certain entity, then the state network uses a certain entity as one input of the state network when the state network performs the next state vector prediction and performs the prediction of the state vector again based on the input information of adding the entity; for another example, when the action currently output by the policy network is that a certain entity is not content of interest to the user, then the state network may perform corresponding set on the entities and/or relationships in the input information in the state network associated with a certain entity, for example, decreasing the weight of the entities and/or relationships associated with a certain entity and predicting the next representation vector based on the adjusted information. In other words, the output result of the policy network is applied to the state network to make that the state network may capture some unique properties according to the output result when predicting the next state representation vector, that is, to make that the state vector output by the state network in the next time may carry some unique information related to the previous output result of the policy network In addition, the content provided by the CP to the user may also be applied to the process of determining whether to update the user's personalization information. At this time, the policy selected by the policy network (i.e., the outputted action) may also include "read the next content provided by the CP". When the policy network selects this policy, the next content provided by the CP may also be used as an input when updating the current state representation vector in the state network. Certainly, the other inputs include the use's personalization information, as well as entities and/or re-lationships extracted from the user feedback information. In other words, the information input to the state network may also be selected differently according to the actual needs, and the action set selected by the policy network may also be configured according to actual needs.

For the example shown in FIG. 17, a relationship classifier (which may be implemented by using any neural network structure) may also be used to determine whether the decision made by the policy network is valid, that is, determining whether to update the personalization information according to the output of the policy network. As shown in FIG. 17, the input of this relationship classifier may be the current state vector and the decision made by the policy network (i.e., output), and the output thereof may be an integer value, and may also be the other identifier information. This integer value represents whether this policy is suitable; when suitable, then the personalization information may be updated based on the output of the policy network, and when not suitable, then the personalization information may not be updated.

In an embodiment, considering reasons such as the data processing efficiency of the terminal device and the occupation of resources of the terminal device, only the training phase of the model needs to use the relationship classifier, and the using phase of the model may not need to use the relationship classifier. The using phase of the model only needs to use the state network and the policy network.

In conclusion, according to an embodiment: 1. The terminal device may actively provide the user's personalization information to the CP, so that the CP may provide more accurate content to the user based on the obtained personalization information.

2. The terminal device may detect in real time whether for the CP to update the user's personalization information. When the CP needs to updates, according to the user's personalization information, the user's personalization information may be provided to CP by generating a serial of operations simulating the user by the simulating user acitivity or by invoking the API, so that the CP updates the user's personalization information according to these operations.

3. The terminal device may detect the feedback of the content provided by the CP in real time, and/or determine whether the content provided by the CP is the content of interest to the user based on the user's personalization information collected by the user. When it is determined that the user is not interested in the recommended content, the user's personalization information may be provided to the CP.

4. When the user wants to purchase the product for another user, and wants to know the content that another user that pays attention to, and further hopes that the CP pushes relevant content that another user pays attention to, the content that another user pays attention to is the content of interest to the user at this time, that is, another user's personalization information may be obtained. In an embodiment, the current terminal device may obtain another user's personalization information that it wants to obtain from the other device, so as to better meet the user's actual needs.

5. In an embodiment, before the user uses the CP for the first time or when using the CP for the first time, the terminal device may simulate the user's operation and/or invoke the API interface in advance according to the user's personalization information to provide the user's personalization information to the CP in advance. For example, in the method shown in FIG. 18, after determining the personalization information to be provided to the CP by the key information extractor, the personalization information to be provided the CP may be provided to the CP by means of invoking the API or by means of simulating the user activities planned by the user activity planner (i.e., simulating a user activity to interact with the CP) so that the CP builds the user's personalization information as fast as possible, which the user may obtain more accurate content provided by the CP while the user uses it, and the CP may simulate the user's operations in advance according to the user's personalization information.

Based on the same principle as the information processing method provided by the embodiment of the disclosure, the embodiment of the disclosure also provides an information processing apparatus. As shown in FIG. 19, the information processing apparatus 100 may mainly include a personalization information obtaining module 110 and a personalization information providing module 120.

The personalization information obtaining module 110 may be configured to obtain user's personalization information;

The personalization information providing module 120 may be configured to provide the user's personalization information to the CP, so that the CP provides the content to the user based on the obtained personalization information.

It is to be understood that the above-described modules of the information processing apparatus in the embodiment of the disclosure have a function of implementing corresponding operations in the information processing method shown in any embodiments of the disclosure, and the function may be implemented by hardware or by the hardware performing the corresponding software, which the hardware or software includes one or more modules corresponding to the functions described above. Each of the above modules may be implemented separately or implemented by means of integrating multiple modules. For a description of the specific functions and the effect of the information processing apparatus may refer to the above corresponding description in the information processing method.

According to an embodiment, when the user's personalization information is provided to the CP, the personalization information providing module 120 may be configured to: detect whether the user's personalization information is changed, and provide the user's personalization information to the content provider according to a detection result; and/or obtain the content provided by the content provider to the user, and provide the user's personalization information to the content provider according to at least one of the user's personalization information and user feedback information, and the content provided by the content provider for the user, wherein the user feedback information includes feedback information returned by the user with respect to the at least one content provided by the content provider.

According to an embodiment, when providing the user's personalization information to the content provider according to at least one of the user's personalization information and user feedback information, and the content provided by the content provider for the user, the personalization information providing module 120 may be configured to: determine whether each content provided by the content provider for the user belongs to the content of interest to the user according to at least one of the user's personalization information and the user feedback information; and provide the user's personalization information to the content provider based on whether each content provided by the content provider for the user belongs to the content of interest to the user.

According to an embodiment, when providing the user's personalization information to the content provider based on whether each content provided by the content provider to the user belongs to the content of interest to the user, the personalization information providing module 120 may be configured to: provide the user's personalization information to the content provider when at least one content in each content provided by the content provider to the user may not belong to the content of interest to the user.

According to an embodiment, when determining whether the respective contents provided by the content provider for the user belong to the content of interest to the user according to at least one of the user's personalization information and the user feedback information, the personalization information providing module 120 may be configured to determine each content representation vector corresponding to each content provided by the content provider for the user; determine a weight of each content representation vector according to at least one of the user's personalization information and the user feedback information; obtain a combined content representation vector based on each content representation vector and the weight of the respective content representation vector; and determine whether each content provided by the content provider to the user belongs to the content of interest to the user according to the combined content representation vector.

According to an embodiment, the user feedback information includes at least one of the following: user's expression information; user instruction information; user's biological signal information; a user interactions on the content provided by the content provider.

According to an embodiment, when providing user's personalization information to the content provider, the personalization information providing module 120 may be configured to: perform a corresponding user activity simulation operation based on the personalization information to be provided to the content provider.

According to an embodiment, when performing corresponding user activity simulation operation, the personalization information providing module 120 may be configured to: determine the user activity simulation operation corresponding to the personalization information to be provided to the CP in each predefined user activity simulation operation; and, perform the determined user activity simulation operation.

According to an embodiment, the predetermined user activity simulation operation includes a feedback operation for the content provided by a content provider to a user.

According to an embodiment, the corresponding user activity simulation operation may include: user activity simulation operation characterizing that the content of the operation is content of interest to the user; and/or user activity simulation operation characterizing that the content of the operation is content of disinterest to the user.

According to an embodiment, the user activity simulation operation characterizing that the content of the operation is content of interest to the user, including at least one of the following: click operation, browse operation, search operation, favorite operation, attention operation, purchase operation and voice input operation; and/or the user activity simulation operation characterizing that the content of the operation is content of disinterest to the user, includes at least one of the following: block operation, delete operation, close operation, cancel favorite operation, cancel attention operation and voice input operation.

According to an embodiment, when providing user's personalization information to the content provide, the personalization information providing module 120 may be configured to: determine personalization information to be provided to the content provider in the user's personalization information; and provide the personalization information to be provided to the content provider to the content provider.

According to an embodiment, when determining the personalization information to be provided to the content provider, the personalization information providing module 120 may be configured to: determine the personalization information to be provided to the content provider according to the changed personalization information when the user's personalization information is changed; and/or, determine the content of interest to the user in the user's personalization information, and determining the personalization information to be provided to the content provider according to the content of interest to the user; and/or, determine the content of disinterest to the user in the user's personalization information, and determining the personalization information to be provided to the content provider according to the content of disinterest to the user.

According to an embodiment, when determining the personalization information to be provided to the content provider according to the content of disinterest to the user, the personalization information providing module 120 may be configured to: determine the content of interest to the user associated with the content of disinterest to the user according to the user's personalization information; and, determine the personalization information to be provided to the content provider according to the determined content of interest to the user.

According to an embodiment, when obtaining the user's personalization information, the personalization information obtaining module 110 may be configured to: obtain the user's personalization information according to a user behavior of the user using a terminal device.

According to an embodiment, the user behavior of the user using the terminal device includes at least one of the following: interactions with content providers, communications with others, searching, the user's location and user feedback on contents.

According to an embodiment, when obtaining the user's personalization information, the personalization information obtaining module 110 may be configured to: obtain the user's personalization information corresponding to another terminal device from another terminal devices.

As an example, FIG. 20 shows a schematic structural diagram of a terminal device to which the embodiment of the disclosure may be applied. The information processing apparatus provided in the embodiment of the disclosure may be deployed in the terminal device 200, and the terminal device 200 may be configured to perform the information processing method provided by the embodiment of the disclosure.

According to an embodiment, the terminal device 200 may mainly include three parts: a user management module, a user personalization information correction module and a personalization information database. The user management module may be configured for detecting the user feedback information, detecting the change of the user's personalization information, obtaining the required another user' personalization information from another user, and determining whether to update the user's personalization information (i.e., whether to provide the personalization information to the CP), and how to update the personalization information. The user personalization information correction module may be configured for interacting with the CP, and providing the user's personalization information to the CP, so that the CP may update the user's personalization information. The personalization information database is mainly responsible for storing, retrieving, and maintaining the user's personalization information.

Specifically, corresponding to the example, the user management module may include the user interaction module, the feedback detection module, the information sharing module, and the biased information detection module shown in FIG. 20. The user personalization information correction module may include the user information correction module and the CP management module shown in FIG. 20. The personalization information database corresponds to the personalization information knowledge base shown in FIG. 20. According to an embodiment, the user interaction module is responsible for interacting with the user, such as receiving the user's in-struction, understanding the user's intention, and the like, and the recognized user in-struction may be input to the feedback detection module or the information sharing module in the form of text or structured key value pair.

The information sharing module is responsible for sharing information between different users, and the received input may include user instructions parsed by the user management module, and may also have the user's personalization information retrieved in user's personalization information database (i.e., the personalization information knowledge base shown in FIG. 20); the output of the information sharing module may be provided to the personalization information knowledge base and be stored in the personalization information knowledge base.

The main function of the feedback detection module is to monitor the user's reaction to the content provided by the CP, that is, receiving the user feedback information, such as whether the user has already purchased a certain product or the user's evaluation on a certain product; the output of the module may be the feedback result of the user with respect to each content provided by the CP, and the feedback result may be input into the personalization information knowledge base, thereby updating the user's personalization information on the terminal based on the feedback result. The output result of the feedback detection module may also be input to the biased information detection module. The biased information detection module determines whether each content provided by the CP for the user is suitable according to the user's feedback result, and the determination process also needs the help of the CP management module, which the main function of the CP management module is to manage the CP, that is, interacting with the CP, and may obtain the content provided by the CP for the user and also provide the user's personalization information to the CP by invoking the API or simulating the user's behaviors. The CP management module also provides the obtained content provided by the CP for the user to the biased information detection module. The biased information detection module may determine each content provided by the CP, and determine whether to correct the biased information in each content, that is, determining whether each content provided by the CP belongs to the content of interest to the user. When there is content provided by the CP that is not of interest to the user which needs to be corrected, then the biased information detection module may provide the personalization information that needs to be corrected to the user information correction module. The user information correction module may help the CP to obtain more accurate and more complete user's personalization information in combination with accurate user's personalization information retrieved from the personalization information knowledge base by the in-teraction of the CP management module and the CP (i.e., dynamically selecting one or more of various interaction methods (e.g., invoking API and simulating user's op-crations)). According to an embodiment, the personalization information in the personalization information knowledge base is mainly obtained based on the user behavior of the user using the terminal device, for example, using the usage record (application usage condition shown in FIG. 20), call record, search record, location record of the various applications, and may also include the various feedback information of the user, for example, the various information set on the terminal device by the user, specifically such as an alarm (clock) set on the terminal device by the user and various record information set on the calendar shown in FIG. 20. Furthermore, during using the terminal device by the user, the user's personalization information may be constantly updated based on the user's feedback information obtained by the feedback detection module, and the interaction information with the respective applications when the user uses the terminal device.

The embodiment of the disclosure provides an electronic device. As shown in FIG. 21, the electronic device 2000 shown in FIG. 21 includes a processor 2001 and a memory 2003. According to an embodiment, the processor 2001 is connected to the memory 2004, for example, through a bus 2002. According to an embodiment, the electronic device 2000 may also include a transceiver 2004. It should be noted that the number of the transceiver 2004 is not limited to one, and the structure of the electronic device 2000 may not constitute a limitation on the embodiments of the disclosure.

According to an embodiment, the processor 2001 is applied to the embodiments of the disclosure for implementing the functions of the respectively modules of the information processing apparatus shown in FIG. 19. The transceiver 2004 includes a receiver and a transmitter. The transceiver 2004 is applied to the embodiments of the disclosure to implement a communication between the electronic device 2000 and another device, to implement data reception and transmission.

According to an embodiment, the apparatus may also include a module for determining the content of interest, which is configured to determine and presenting the content of interest to the user corresponding to another terminal device based on the obtained user's personalization information corresponding to another terminal device.

According to an embodiment, when obtaining the user's personalization information, the personalization information obtaining module 110 may be configured to: obtain user's identification information; and, obtain user's personalization information based on the user's identification information.

The information processing apparatus provided by the embodiment of the disclosure may be an apparatus that may perform the information processing method in the embodiment of the disclosure. Therefore, those skilled in the art should understand specific embodiments of the information processing apparatus of the embodiment of the disclosure and various modifications thereof, therefore how to implement the information processing method in the embodiment of the disclosure in the information processing apparatus may be not described in detail. An apparatus used by those skilled in the art to implement the information processing method in the embodiments of the disclosure is also within the protection scope of the disclosure.

The processor 2001 may be a CPU (Central Processing Unit), a general-purpose processor, a DSP (Digital Signal Processor), an ASIC (Application Specific Integrated Circuit), and an FPGA (Field Programmable Gate Array) or other programmable logic device, transistor logic device, hardware component, or any combination thereof. It is possible to implement or carry out the various illustrative logical blocks, modules and circuits described in connection with the disclosure. The processor 4001 may also be a combination of computing functions, such as one or more microprocessor com-binations, a combination of a DSP and a microprocessor, and the like.

The bus 2002 may include a path for communicating information between the above components. The bus 2002 may be a PCI (Peripheral Component Interconnect) bus or an EISA (Extended Industry Standard Architecture) bus. The bus 2002 may be divided into an address bus, a data bus, a control bus, and the like. For convenience of representation, only one thick line in FIG. 21 is used to represent the bus, but it may not mean that there is only one bus or one type of bus.

The memory 2003 may be a ROM (Read Only Memory) or another type of static storage device that may store static information and instructions, or an RAM (Random Access Memory) or another type of dynamic storage device that may store information and instruction, and may also be an EEPROM (Electrically Erasable Programmable Read Only Memory), a CD-ROM (Compact Disc Read Only Memory) or another optical disc storage, optical disc storage (including compression optical disc, laser disc, optical disc, digital versatile disc, Blu-ray discs, etc.), a magnetic disk storage medium or another magnetic storage device, or any other medium that can be used to carry or store desired program codes in form of instruction or data structure and can be accessed by the computer.

According to an embodiment, the memory 2003 is used to store application program codes for carrying out methods according to an embodiment, and is controlled by the processor 2001 for execution. The processor 2001 is configured to execute the application program codes stored in the memory 2003 to implement the actions of the apparatus provided by the embodiments of the disclosure.

FIG. 22 is a flowchart of a method according to an embodiment of the disclosure.

At operation S2210, information of a user is collected based on user activities on an electronic device. The user activities may include accessing a web-page of a certain topic or product, searching, purchasing, bookmarking, etc. Explanation of collecting the information of the user is described as above, for example, by referring to FIG. 2.

At operation S2220, the collected information of the user is analyzed for generating a personal knowledge graph of the user. Explanation of analyzing the collected information for generating the personal knowledge graph of the user is described as above, for example, by referring to FIG. 3. The personal knowledge graph may be modified based on receiving a natural language input of the user. Explanation of modifying the personal knowledge graph is described as above, for example, by referring to FIG. 4, FIG. 5, and FIG. 16. The personal knowledge graph of the user may be generated by a learning model, which is explained as above, for example, by referring to FIG. 6.

At operation S2230, personalization information is provided to a content provider (CP) based on the personal knowledge graph. The personalization information of the user may be user profile information of the user. The user profile information of the user may be generated based on at least one sub-graph of the personal knowledge graph. The personalization information may be generated from the personal knowledge graph to include information requested from the CP under the user's grant. Information which is not allowed by the user to be provided to the CP may be excluded from the personalization information.

At operation S2240, at least one content which is provided from the CP is received at the electronic device. The at least one content may be ads or recommendation from the CP, but not limited thereto.

The electronic device may determine whether the received at least one content cor-responds to the user's interest. According to an embodiment, whether the received at least one content corresponds to the user's interest may be determined based on receiving a natural language input of the user regarding the received at least one content, which is explained as above, for example, by referring to FIG. 5 and FIG. 6.

The electronic device may determine at least one content representation vector respectively corresponding to the received at least one content provided by the CP, determine at least one weight for the at least one content representation vector respectively, obtain at least one combined content representation vector based on the at least one content representation vector and the at least one weight, and determine whether the received at least one content corresponds to the user's interest based on the at least one combined content representation vector. Explanation of content representation vectors is described as above, for example, by referring to FIG. 17.

Additional personalization information may be provided to the CP through an application programming interface (API) provided the CP, which is explained as above, for example, by referring to FIG. 7 and FIG. 18.

In an embodiment, a user activity may be simulated at the electronic device. For example, a user activity of reporting a user feedback on the content to the CP may be simulated at the electronic device. A user activity of selecting a content provided by the CP may be simulated at the electronic device. Explanation of simulating a user activity is described as above, for example, by referring to FIG. 8, FIG. 9, and FIG. 10.

In an embodiment, the user activity may be simulated based on information requested from the CP. For example, a user activity of selecting the content may be simulated based on information requested from the CP.

The personalization information may be provided to the CP based on the personal knowledge graph upon downloading an application for accessing the CP at the electronic device.

In an embodiment, the electronic device may detect a user based on information sensed at the electronic device, and provide the at least one content on a display of the electronic device based on the identified user. Here, the at least one content is not provided to another user who uses the electronic device when the electronic device detects that the other user is using the electronic device. Accordingly, when a plurality of users use the same device, the device may detect a user who is currently using the device based on the sensed information, and then provide the detected user with appropriate contents. Explanation of detecting a user is described as above, for example, by referring to FIG. 14 and FIG. 15.

In an embodiment, the electronic device of the user may request another user to provide the other user's personalization information based on a request of the user. The other user's personalization information may be provided to the CP to receive at the electronic device a content corresponding to the other user's interest. Explanation of using the other user's personalization information is described as above, for example, by referring to FIG. 12 and FIG. 13. According to an embodiment, a computer readable storage medium storing a computer program is further provided. The computer readable storage medium stores a computer program that, when executed by a processor, causes the processor to execute a method of displaying an icon in an electronic terminal. The computer readable storage medium is any data storage device that can store data which is read by a computer system. Examples of the computer readable storage medium includes: a read only memory (ROM), a random access memory (RAM), a read-only optical disc, a magnetic tape, a floppy disk, an optical data storage device, and a carrier wave. A computer program product may be or include the computer readable storage medium, but is not limited thereto.

Moreover, it should be understood that various units according to an embodiment may be implemented as hardware components and/or software components. Those skilled in the art can implement the various units, for example, using a Field Programmable Gate Array (FPGA) or an Application Specific Integrated Circuit (ASIC), depending on the processing performed by the various defined units.

Further, embodiments may be implemented as computer codes in a computer readable recording medium by those skilled in the art according to the disclosure. The computer codes are carried out when the computer codes are executed in a computer.

Although the disclosure has been described with various embodiments, various changes and modifications may be suggested to one skilled in the art. It is intended that the disclosure encompass such changes and modifications as fall within the scope of the appended claims.

The invention claimed is:

1. An electronic device comprising:
a memory storing instructions; and
at least one processor configured to execute the instructions to:
collect information of a user based on user activities on the electronic device, the information including at least voice information received by the electronic device;
analyze the collected information of the user for generating a personal knowledge graph of the user;
provide personalization information generated based on the personal knowledge graph to a content provider (CP);
receive at least one content provided from the CP, wherein the at least one content is selected based on the personalization information by the CP; and
provide recommendation content selected from among the at least one content based on the personalized information,
wherein probabilities of different users are predicted based on a current usage state of the electronic device, based on the voice information.

2. The electronic device of claim 1, wherein the personalization information comprises a user profile information generated based on at least one sub-graph of the personal knowledge graph.

3. The electronic device of claim 1, wherein the personalization information includes information requested from the CP, and excludes information which is not allowed by the user to be provided to the CP.

4. The electronic device of claim 1, wherein the at least one processor is further configured to execute the instructions to modify the personal knowledge graph based on receiving a natural language input of the user.

5. The electronic device of claim 1, wherein the at least one processor is further configured to execute the instructions to determine whether the received at least one content corresponds to a user's interest.

6. The electronic device of claim 1, wherein the at least one processor is further configured to execute the instructions to:
determine at least one content representation vector respectively corresponding to the received at least one content provided by the CP;
determine at least one weight for the at least one content representation vector respectively;
obtain at least one combined content representation vector based on the at least one content representation vector and the at least one weight; and
determine whether the received at least one content corresponds to a user's interest based on the at least one combined content representation vector.

7. The electronic device of claim 1, wherein the at least one processor is further configured to execute the instructions to:
provide additional personalization information to the CP through an application programming interface (API) provided the CP.

8. The electronic device of claim 1, wherein the at least one processor is further configured to execute the instructions to:

simulate at least one of a user activity of reporting a user feedback on the content to the CP, and a user activity of selecting a content provided by the CP.

9. The electronic device of claim 1, wherein the personalization information is provided to the CP based on the personal knowledge graph upon downloading an application for accessing the CP at the electronic device.

10. The electronic device of claim 1, wherein the at least one processor is further configured to execute the instructions to:

detect the user based on information sensed at the electronic device; and provide the at least one content on a display of the electronic device based on the identified user.

11. The electronic device of claim 1, wherein the at least one processor is further configured to execute the instructions to:

request another user to provide the another user's personalization information based on a request of the user.

12. The electronic device of claim 11, wherein the another user's personalization information is provided to the CP to receive at the electronic device a content corresponding to an another user's interest.

13. The electronic device of claim 1, wherein the personal knowledge graph of the user is generated by a learning model.

14. A method comprising:

collecting information of a user based on user activities on the electronic device, the information including at least one of voice information received by the electronic device;

analyzing the collected information of the user for generating a personal knowledge graph of the user;

providing personalization information generated based on the personal knowledge graph to a content provider (CP);

receiving at least one content which is provided from the CP, wherein the at least one content is selected based on the personalization information by the CP; and provide recommendation content selected from among the at least one content based on the personalized information, wherein probabilities of different users are predicted based on a current usage state of the electronic device, based on the voice information.

15. A computer program product comprising a computer readable medium having stored thereon instructions, which when executed, cause at least one processor to carry out the method of claim 14.

16. The electronic device of claim 1, wherein the at least one processor is further configured to execute the instructions to:

determine inaccurate content from among the at least one content based on a user preference; and determine the recommendation content by removing the inaccurate content from among the at least one content, wherein the user preference is determined based on the user activity.

* * * * *